(12) United States Patent
Takeda et al.

(10) Patent No.: US 9,735,947 B2
(45) Date of Patent: *Aug. 15, 2017

(54) TRANSMITTING DEVICE AND TRANSMITTING METHOD

(71) Applicant: Panasonic Intellectual Property Corporation of America, Torrance, CA (US)

(72) Inventors: Kazuki Takeda, Kanagawa (JP); Masayuki Hoshino, Kanagawa (JP); Alexander Golitschek Edler von Elbwart, Darmstadt (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/253,594

(22) Filed: Aug. 31, 2016

(65) Prior Publication Data

US 2017/0005772 A1  Jan. 5, 2017

Related U.S. Application Data

(63) Continuation of application No. 14/226,570, filed on Mar. 26, 2014, now Pat. No. 9,461,807.

(30) Foreign Application Priority Data

Mar. 28, 2013 (JP) .................................. 2013-069377

(51) Int. Cl.
*H04L 5/00* (2006.01)
*H04W 52/24* (2009.01)
*H04L 1/00* (2006.01)

(52) U.S. Cl.
CPC .......... *H04L 5/0073* (2013.01); *H04L 1/0003* (2013.01); *H04L 5/0044* (2013.01); *H04L 5/0051* (2013.01); *H04W 52/244* (2013.01)

(58) Field of Classification Search
CPC ... H04L 5/0073; H04L 5/0051; H04L 5/0048; H04L 5/0053; H04L 5/0023; H04W 52/244; H04W 72/042
(Continued)

(56) References Cited

U.S. PATENT DOCUMENTS

| 2011/0051749 | A1 | 3/2011 | Cheng et al. |
| 2012/0113920 | A1 | 5/2012 | Cheng et al. |
| 2012/0163335 | A1* | 6/2012 | Chung .................. H04L 5/0023 370/330 |

FOREIGN PATENT DOCUMENTS

EP  2 975 783 A1  1/2016

OTHER PUBLICATIONS

3GPP TR 36.932 V12.0.0, "3rd Generation Partnership Project; Technical Specification Group Radio Access Network; Scenarios and Requirements for Small Cell Enhancements for E-UTRA and E-UTRAN (Release 12)," Dec. 2012, 14 pages.
(Continued)

*Primary Examiner* — Jamal Javaid
(74) *Attorney, Agent, or Firm* — Seed IP Law Group LLP

(57) ABSTRACT

A transmitting device includes a controller and a transmitter. The controller, in operation, adds an offset to a transmission power or a transmission power density of first data mapped in a remaining resource other than a data resource, to control a transmission power or a transmission power density of second data mapped in the data resource, for use of a second mapping pattern. A part of a resource on which a reference signal is to be mapped in a first mapping pattern of the reference signal is replaced with the data resource in a second mapping pattern of the reference signal. The trans-
(Continued)

mitter, in operation, transmits a signal including the first data, the second data, and the reference signal.

20 Claims, 24 Drawing Sheets

(58) Field of Classification Search
USPC .................. 370/329, 252, 312, 330, 280
See application file for complete search history.

(56) References Cited

OTHER PUBLICATIONS

ETSI TS 136 211 V11.1.0, "LTE; Evolved Universal Terrestrial Radio Access (E-UTRA); Physical channels and modulation (3GPP TS 36.211 version 11.1.0 Release 11)," Feb. 2013, 109 pages.
ETSI TS 136 212 V11.1.0, "LTE; Evolved Universal Terrestrial Radio Access (E-UTRA); Multiplexing and channel coding (3GPP TS 36.212 version 11.1.0 Release 11)" Feb. 2013, 84 pages.
ETSI TS 136 213 V11.1.0, "LTE; Evolved Universal Terrestrial Radio Access {E-UTRA); Physical layer procedures (3GPP TS 36.213 version 11.1.0 Release 11)," Feb. 2013, 162 pages.
Extended European Search Report, dated Feb. 24, 2016, for corresponding European Application No. 14161726.6-1851 / 2784970, 13 pages.
Nokia, Nokia Siemens Networks, "Evaluation Assumptions on Schemes to Enhance Small Cell Spectral Efficiency," R1-130491, 3GPP TSG RAN WG1 Meeting #72, Agenda Item:7.3.5.2, St. Julian's, Malta, 2013, 4 pages.
Zhang et al., "LTE-Advanced Air Interface Technology," Sep. 5, 2012, CRC Press, pp. 129-131 (3 pages).

* cited by examiner

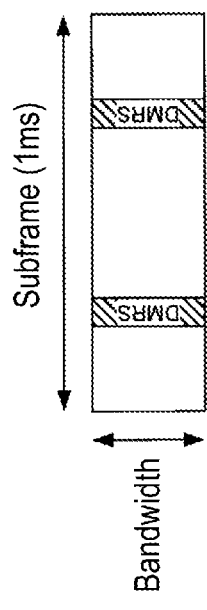
FIG.4(A) Legacy DMRS pattern
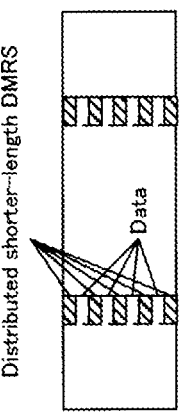
FIG.4(B) Reduced DMRS pattern (1)
FIG.4(C) Reduced DMRS pattern (2)
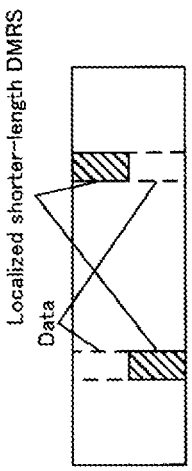
FIG.4(D) Reduced DMRS pattern (3)
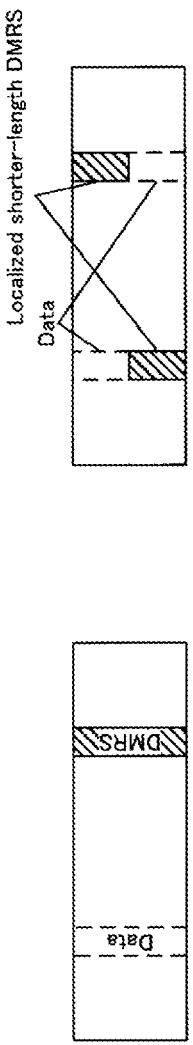
FIG.4(E) Reduced DMRS pattern (4)

| Value of DMRS pattern indicator | DMRS pattern | Offset value X |
|---|---|---|
| 00 | Legacy DMRS | 0 (same as other part) |
| 01 | Reduced DMRS (Pattern 1) | 3 (3dBm down) |
| 10 | Reduced DMRS (Pattern 2) | 6 (6dBm down) |
| 11 | Reduced DMRS (Pattern 3) | 3 (3dBm down) |

FIG. 13

| Allocated no. of RBs for PUSCH | Offset value X |
|---|---|
| $24 - N_{RB}^{UL}$ | 0 (same as other part) |
| 15 – 23 | 2 (2dBm down) |
| 10 – 14 | 4 (4dBm down) |
| 1 – 9 | 6 (6dBm down) |

FIG. 15

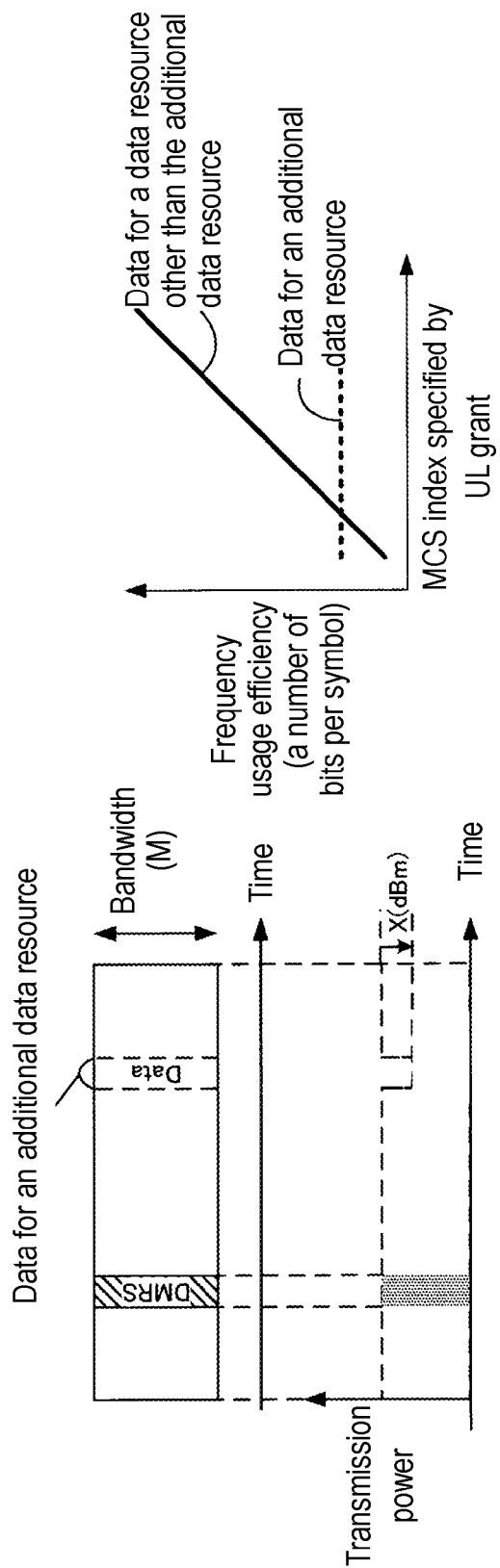

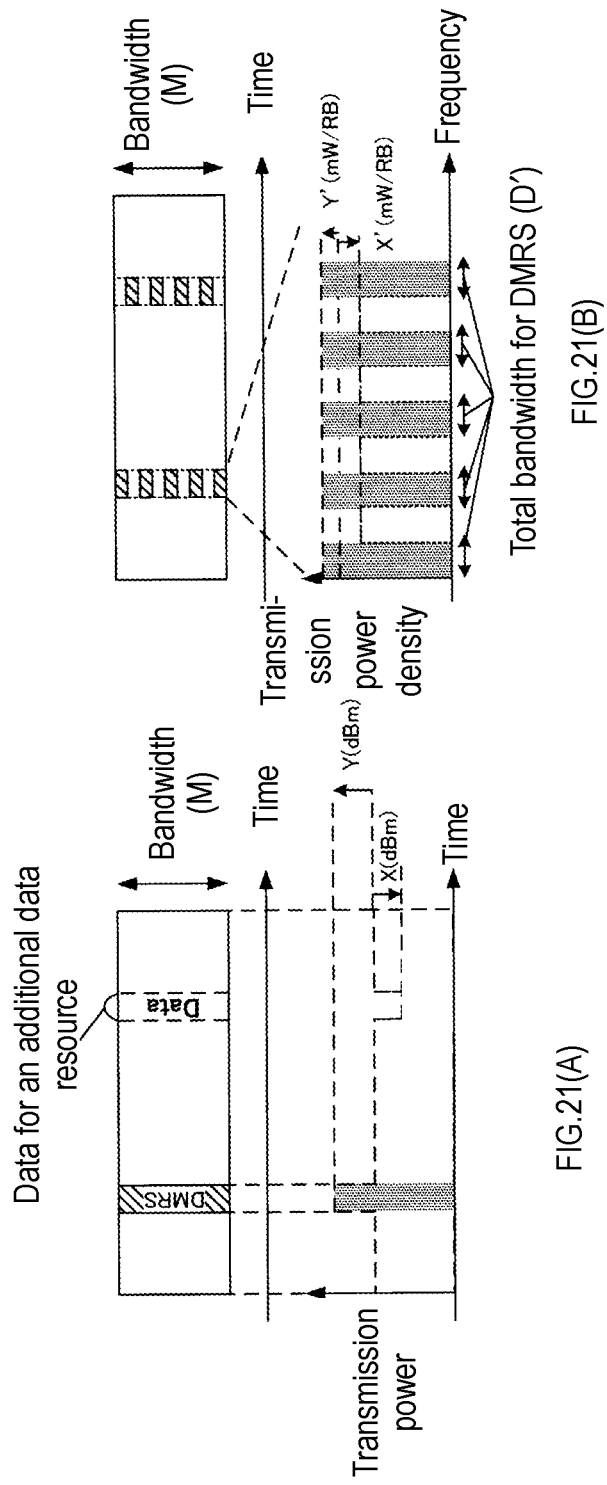

| Value of DMRS pattern indicator | DMRS pattern | Offset value Y |
|---|---|---|
| 00 | Legacy DMRS | 0 (same as other part) |
| 01 | Reduced DMRS (Pattern 1) | 3 (3dBm boost) |
| 10 | Reduced DMRS (Pattern 2) | 6 (6dBm boost) |
| 11 | Reduced DMRS (Pattern 3) | 3 (3dBm boost) |

FIG. 22

| Allocated no. of RBs for PUSCH | Offset value Y |
|---|---|
| $24 - N_{RB}^{UL}$ | 0 (same as other part) |
| 15 – 23 | 2 (2dBm boost) |
| 10 – 14 | 4 (4dBm boost) |
| 1 – 9 | 6 (6dBm boost) |

FIG. 24

TRANSMITTING DEVICE AND TRANSMITTING METHOD

BACKGROUND

Technical Field

The present disclosure relates to a transmitting device and a transmitting method.

Description of the Related Art

In LTE (Long Term Evolution) Rel.8 (Release 8) developed by 3GPP (3rd Generation Partnership Project Radio Access Network), SC-FDMA (single-carrier frequency-division multiple-access) is adopted as an uplink communication system (for example, see 3GPP TS 36.211, "Evolved Universal Terrestrial Radio Access (E-UTRA); Physical channels and modulation," v.11.1.0, 3GPP TS 36.212, "Evolved Universal Terrestrial Radio Access (E-UTRA); Multiplexing and channel coding," v.11.1.0, and 3GPP TS 36.213, "Evolved Universal Terrestrial Radio Access (E-UTRA); Physical layer procedures," v.11.1.0). The SC-FDMA has a smaller PAPR (Peak-to-Average Power Ratio) and higher power usage efficiency at a user terminal, (UE: User Equipment).

In an uplink of the LTE, a data signal is transmitted in units of subframes using a PUSCH (Physical Uplink Shared Channel), and a control signal is transmitted in units of subframes using a PUCCH (Physical Uplink Control Channel) (for example, see 3GPP TS 36.211, "Evolved Universal Terrestrial Radio Access (E-UTRA); Physical channels and modulation," v.11.1.0). FIG. 1 illustrates a configuration example of a PUSCH subframe in a case that a normal cyclic prefix is used. As illustrated in FIG. 1, one subframe consists of two time slots. A plurality of SC-FDMA data symbols and one pilot symbol (referred to as a DMRS (Demodulation Reference Signal)) are time-multiplexed in each time slot. When receiving the PUSCH, the base station performs channel estimation using the DMRS. Then the base station demodulates and decodes the SC-FDMA data symbols using a channel estimation result. DFT-S-OFDM (Discrete-Fourier-Transform Spread Orthogonal Frequency Division Multiplexing) that is an extended version of the SC-FDMA can also be used in LTE-A (LTE-Advanced) Rel.10 (Release 10). In the DFT-S-OFDM, the PUSCH in FIG. 1 is divided into two spectra, and each spectrum is mapped to a different frequency bandwidth, thereby increasing a flexibility of scheduling.

The DMRS multiplexed on the PUSCH is generated based on a CAZAC (Constant Amplitude Zero Auto-Correlation) sequence having excellent auto-correlation characteristic and cross-correlation characteristic. 30 sequence groups are defined in the LTE. Each sequence group is generated by grouping the plurality of CAZAC sequences into one group (for example, see FIG. 2). Each sequence group includes the plurality of CAZAC sequences having a large correlation, and the plurality of CAZAC sequences have various sequence lengths. One of the 30 sequence groups is allocated to each cell based on a cell ID which is an ID specific to the cell. Therefore, different sequence groups having small correlation therebetween are allocated to different cells.

A user terminal generates the DMRS using the CAZAC sequence that has the sequence length corresponding to an allocated bandwidth among the plurality of CAZAC sequences. The plurality of CAZAC sequences are included in the sequence group which is allocated to the cell to which the user terminal belongs. And the user terminal time-multiplexes the DMRS on the PUSCH. Therefore, DMRSs having a large correlation are transmitted between the plurality of user terminals belonging to the same cell, and DMRSs having a small correlation are transmitted among a plurality of user terminals belonging to different cells. Because a correlation of the DMRSs is small between the cells, interference can be reduced by a window function method or by averaging, even if the interference is generated between the DMRSs transmitted at the same timing. On the other hand, in the same cell, the DMRSs of the plurality of user terminals are orthogonalized by allocating different frequency bandwidths or different time periods to the plurality of user terminals, which allows the interference not to be generated. The same frequency bandwidth or the same time period can be allocated to the plurality of user terminals (referred to as MU-MIMO (Multi-user multi-input multi-output)). In this case, the DMRSs of the user terminals can be orthogonally multiplexed by performing different cyclic shifts (CSs) to the DMRSs of the user terminals or multiplying two DMRSs in the PUSCH by different OCCs (Orthogonal Cover Codes) among the user terminals.

As described above, among a plurality of cells, an interference among the plurality of signals transmitted at the same time period can be reduced by using sequence groups different among the a plurality of cells, and spatial reuse of a wireless resource can be implemented. In one cell, the wireless resource can efficiently be used by applying the MU-MIMO. Therefore, high-efficiency uplink transmission can be implemented in the LTE.

Further, a virtual cell ID that is an ID different from the cell ID specific to the cell is added in LTE-A Rel.11 (Release 11). In the virtual cell ID, any sequence group can be allocated to any user terminal irrespective of the cell ID of the cell to which the user terminal belongs.

However, conventionally, in the case that the DMRSs are transmitted among the plurality of cells using different mapping patterns, sometimes the DMRSs can cause an interference to a DMRS of another user terminal belonging to another cell such as a peripheral cell including a neighbor cell.

BRIEF SUMMARY

One non-limiting and exemplary embodiment provides a transmitting device that can reduce an influence by the interference to a user terminal belonging to the other cell such as the peripheral cell in a case that the DMRSs are transmitted using mapping patterns different among a plurality of cells.

Additional benefits and advantages of the disclosed embodiments will be apparent from the specification and figures. The benefits and/or advantages may be individually provided by the various embodiments and features of the specification and drawings disclosure, and need not all be provided in order to obtain one or more of the same.

In one general aspect, the techniques disclosed here feature: a transmitting device comprising: a control section that adds an offset to a transmission power or a transmission power density of first data mapped in a remaining resource other than a data resource, to control a transmission power or a transmission power density of second data mapped in the data resource, for use of a second mapping pattern, wherein a part of a resource on which a DMRS (Demodulation Reference Signal) is to be mapped in a first mapping pattern of the DMRS is replaced with the data resource in a second mapping pattern of the DMRS; and a transmitting section that transmits a signal including the first data, the second data, and the DMRS.

These general and specific aspects may be implemented using a system, a method, and a computer program, and any combination of systems, methods, and computer programs.

According to the present disclosure, the influence by the interference to another user terminal belonging to the other cell such as the peripheral cell can be reduced in the case that the DMRSs are transmitted using mapping patterns different among a plurality of cells.

BRIEF DESCRIPTION OF THE SEVERAL VIEWS OF THE DRAWINGS

FIGS. 4(A) to 4(E) illustrate examples of a legacy DMRS pattern and a reduced DMRS pattern;

FIG. 13 illustrates a correspondence among a DPI, a DMRS pattern, and the offset according to the first exemplary embodiment of the present disclosure;

FIG. 15 illustrates a correspondence relationship between the allocated bandwidth and the offset according to the first exemplary embodiment of the present disclosure;

FIGS. 17(A) and 17(B) illustrate the offset and an MCS level of the additional data resource according to a second exemplary embodiment of the present disclosure;

FIGS. 21(A) and 21(B) illustrate the additional data resource and the transmission power control of the DMRS according to a third exemplary embodiment of the present disclosure;

FIG. 22 illustrates the correspondence among the DPI, the DMRS pattern, and the offset according to the third exemplary embodiment of the present disclosure;

FIG. 24 illustrates a correspondence relationship between the allocated bandwidth and the offset according to the third exemplary embodiment of the present disclosure.

DETAILED DESCRIPTION

First, items studied by the inventors of the present disclosure will be described prior to the description of each exemplary embodiment of the present disclosure.

Figure 3:
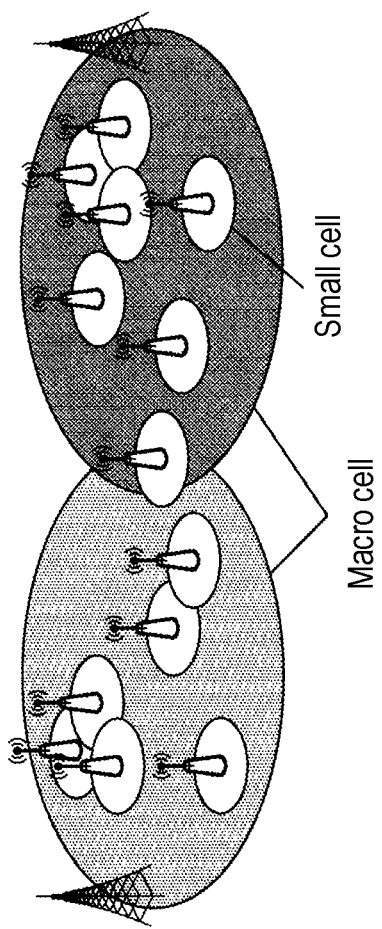
FIG. 3 illustrates a network configuration in small cell enhancement.

Nowadays, an explosive increase in mobile traffic is generated along with wide spread of a smartphone. It is necessary to drastically improve usage efficiency of a wireless resource in order to provide stress-free mobile data communication service to users. Therefore, a small cell enhancement in which an infinite number of small cell base stations constituting a small cell are arranged is studied in LTE-A Rel.12 (Release 12) (for example, see 3GPP TR 36.932, "Scenarios and Requirements for Small Cell Enhancements," v.12.0.0). In the small cell enhancement, coverage of each cell is reduced and the number of user terminals per cell is decreased, which allows the wireless resource allocated to one user terminal in each cell to be increased and a data rate of the user terminal is enhanced. On the other hand, it is unrealistic that all areas are covered with the small cells. There is also a problem in that a handover frequency increases when the user terminal having a high moving speed is connected to the small cell. Accordingly, it is studied that the small cell is arranged so as to overlap with a macro cell having a large coverage (for example, see FIG. 3, sometimes referred to as HetNet (Heterogeneous Network)). Therefore, the macro cell can support any user terminal while eliminating a coverage hole, and the small cell can provide large-capacity communication to a low-moving-speed user terminal that demands the high-speed data communication service.

A network configuration (for example, see FIG. 3) studied in the small cell enhancement has the following features.

(1) The small cell tends to have a good state and quality of a propagation path from the small cell base station to the user terminal. This is because the communication can be performed with a high reception power or a high signal-to-noise power ratio due to a high probability that a distance between the small cell base station and the user terminal is short. For the same reason, there is a high probability that transmission power required for the user terminal is small.

(2) Because the small cell has a small coverage, a number of user terminals operated simultaneously in the small cell is smaller than that in the macro cell. In some cases, the small cell only communicates with one or two user terminals.

(3) Unlike the macro cell, the small cells are more likely to be not evenly deployed. Sometimes the small cells are locally deployed with high density, or coarsely deployed in a wide area.

Because of the above features, the state and the quality of the channel are good in an uplink of the user terminal communicating with the small cell base station in the small cell enhancement. Therefore, it is considered that the base station can perform channel estimation with sufficiently high accuracy. Little benefit of the MU-MIMO is gained because the number of user terminals operated simultaneously is small in each small cell. Accordingly, unlike FIG. 1, at least 14% (one-seventh of the total) of the resource in the PUSCH subframe is not necessarily used as the DMRS. That is, in the uplink of the user terminal communicating with the small cell base station, higher throughput of the user terminal can be achieved when the number of DMRSs is decreased in the PUSCH subframe and wireless resource of the decreased DMRS is diverted to the reduced resource to the data transmission.

For this reason, application of a technology (hereinafter referred to as a "reduced DMRS") for enhancing a data rate per user terminal and a data rate per subframe by replacing part of the DMRS included in the PUSCH subframe with data is studied in the small cell enhancement. For example, the data rate can be enhanced by about 7% when the DMRS included in the PUSCH subframe in FIG. 1 is reduced to a half, and the data rate can be enhanced by about 11% when the DMRS is reduced to a quarter.

FIG. 4 illustrates an example of a mapping pattern (legacy DMRS pattern) indicating a mapping of the DMRS (legacy DMRS) before Rel.11 in one subframe and examples (reduced DMRS patterns (1) to (4)) of the mapping pattern indicating the mapping of the DMRS (reduced DMRS) applied after Rel.12 in one subframe. As illustrated in FIG. 4, the reduced DMRS patterns are smaller than the legacy DMRS pattern in a ratio of the DMRS in the subframe. That is, the reduced DMRS pattern is smaller than the legacy DMRS pattern in the resource in which the DMRS is mapped.

Figure 1:
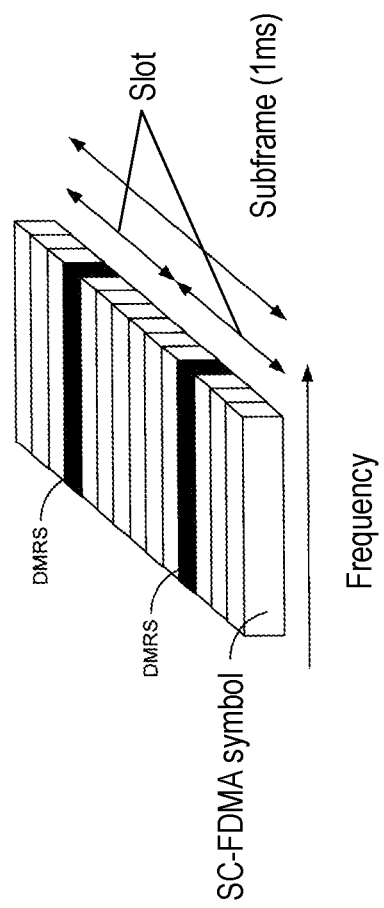
FIG. 1 illustrates an uplink subframe configuration.
Figure 2:
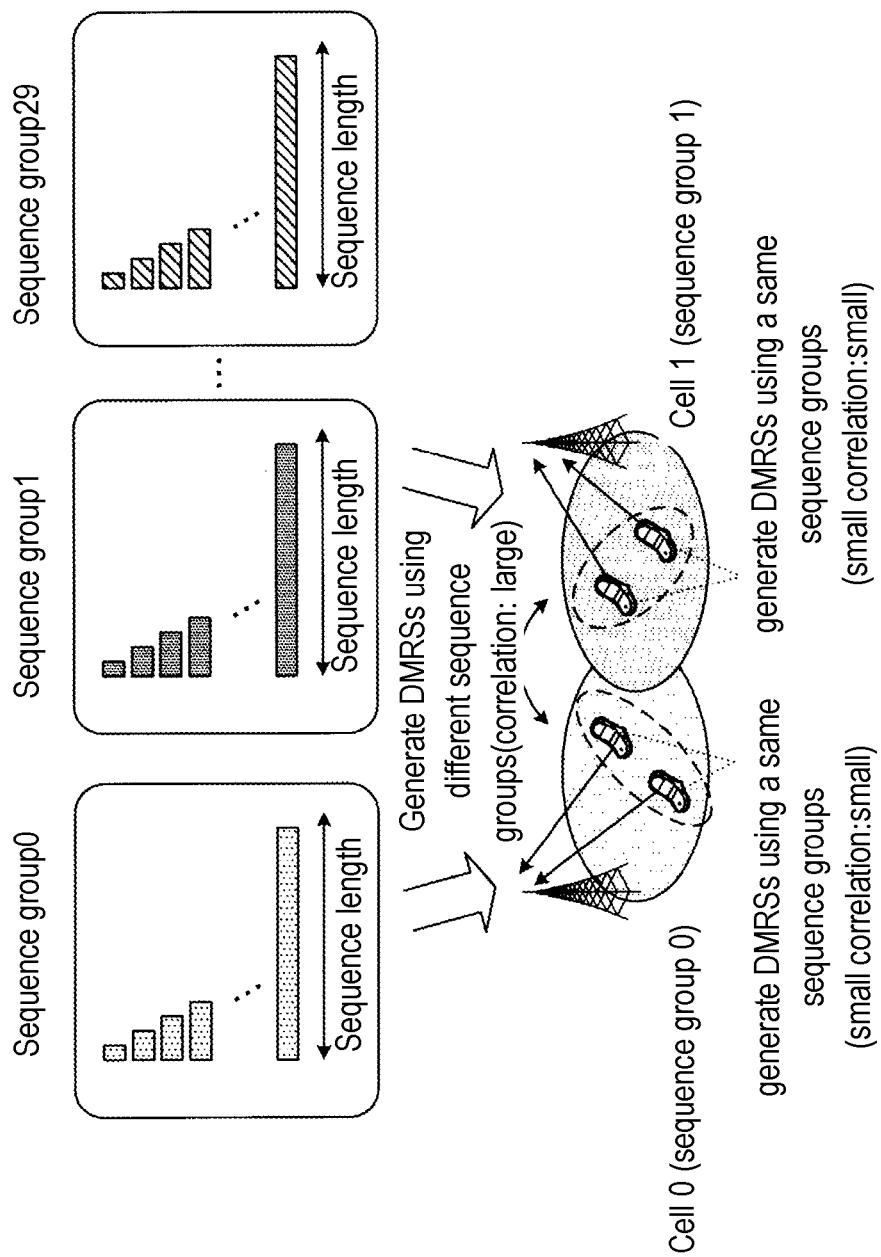
FIG. 2 illustrates sequence group allocation of a DMRS.

In the legacy DMRS pattern (see FIG. 4(A)), two DMRSs are mapped in one subframe according to the subframe configuration in FIG. 1.

Figure 5A:
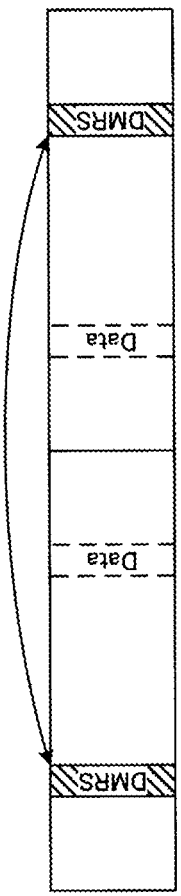
FIGS. 5(A) and 5(B) illustrate orthogonal multiplexing with orthogonal cover codes using the reduced DMRS pattern.
Figure 5B:
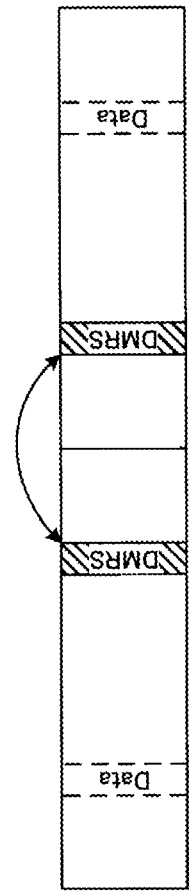

In reduced DMRS patterns (1) and (2) (see FIGS. 4(B) and 4(C)), one of the two DMRSs included in the legacy DMRS pattern (see FIG. 4(A)) is replaced with data. Therefore, although application of an Orthogonal Cover Code (OCC) becomes difficult, the data rate can be enhanced by increasing a data allocation amount. When the PUSCH subframes of the reduced DMRS patterns (1) and (2) are continuously transmitted while coupled to each other in a time direction, the two DMRSs can be used over the two subframes, and the multiplexing can be performed using the orthogonal cover code (for example, see FIG. 5(A)). Similarly, when the PUSCH subframes of the reduced DMRS patterns (2) and (1) are continuously transmitted while coupled to each other in a time direction, the multiplexing can be performed using the orthogonal cover code (see FIG. 5(B)). In FIG. 5(B), a distance in a time axis between the two DMRSs multiplied by the orthogonal cover code is small compared with FIG. 5(A), so that the MU-MIMO can be applied to the user terminal having the high moving speed.

In reduced DMRS pattern (3) (see FIG. 4(D)), distributed mapping of the DMRSs having a sequence length shorter than that corresponding to the allocated bandwidth is performed in an SC-FDMA symbol. Similarly to reduced DMRS patterns (1) and (2), the data rate can be enhanced by allocating the data to a Resource Element (RE) on which the DMRS is not mapped. A configuration in which the DMRSs are mapped in the two SC-FDMA symbols different from each other in one subframe is maintained in reduced DMRS pattern (3). Therefore, similarly to the legacy DMRS pattern (see FIG. 4(A)) of Rel.11, the DMRSs of the plurality of user terminals can be orthogonally multiplexed using the orthogonal cover code. Accordingly, in reduced DMRS pattern (3), there is a merit that it is easy to apply the MU-MIMO. On the other hand, in reduced DMRS pattern (3), because the DMRS and the data are frequency-multiplexed in the same SC-FDMA symbol, there is a fear of increasing the PAPR of the user terminal. However, because of a high probability that the transmission power of the user terminal connecting to the small cell base station is small, the increase in PAPR of the user terminal hardly becomes a large problem. In reduced DMRS pattern (3), a frequency position of the resource element in which the DMRS is mapped may be shifted between the two SC-FDMA symbols including the DMRS (not illustrated). In this case, channel estimation accuracy can also be enhanced by averaging or interpolating channel estimation values using the DMRSs included in the two SC-FDMA symbols.

Reduced DMRS pattern (4) (see FIG. 4(E)) is a method for localized-mapping of the DMRS having the sequence length shorter than that corresponding to the allocated bandwidth in the SC-FDMA symbol. The same effect as reduced DMRS pattern (3) is obtained in reduced DMRS pattern (4). In reduced DMRS pattern (4), compared with reduced DMRS pattern (3), a channel variation is easily estimated in a frequency direction in a frequency bandwidth on which the DMRS is mapped. In reduced DMRS pattern (4), the position of the frequency bandwidth on which the DMRS is mapped and the relative frequency positions of the DMRS in one of the SC-FDMA symbols and the DMRS in the other SC-FDMA symbol are not limited to the example in FIG. 4(E). The examples of the reduced DMRS are described above.

The inventors of the present disclosure found that there is a possibility that transmitting the DMRSs using different mapping patterns between a plurality of cells may cause interferences to a user terminal of the other cell such as the peripheral cell including a neighbor cell. As a result of the study on this point, the inventors of the present disclosure have obtained the following knowledge.

The legacy DMRS before Rel.11 is designed such that all of the user terminals transmitting the PUSCH subframe transmit DMRSs using common time and frequency resources. The same design is made between the cells neighbor to each other. In a cellular system where synchronization is achieved to some extent, the DMRS in the PUSCH subframe is operated so as to be able to suffer the interference from the DMRS of the neighbor cell. However, as described above, because the sequences having a small correlation are used in the DMRS between the cells neighbor to each other, there is a merit that the interference between the cells can be reduced by averaging and filtering.

On the other hand, it is considered that the use of the reduced DMRS is individually notified to the user terminal having the good channel condition or the user terminal having the low moving speed. That is, there is a high probability that the legacy DMRS is still used in the user terminal having the bad channel condition or the user terminal having the high moving speed. The user terminal that supports only functions before Rel.11 can transmit only the legacy DMRS. Accordingly, the legacy DMRS and the reduced DMRS can be mixed in the system. Particularly, in the cells that cannot perform coordination of the scheduler, sometimes each cell cannot identify whether the DMRS pattern used in the user terminal of the cell is the legacy DMRS pattern or one of the reduced DMRS patterns. In such cases, there is a possibility that the data symbol of the user terminal transmitting the reduced DMRS may cause large interferences to the legacy DMRS transmitted by another user terminal of the other cell such as the neighbor cell.

Figure 6:
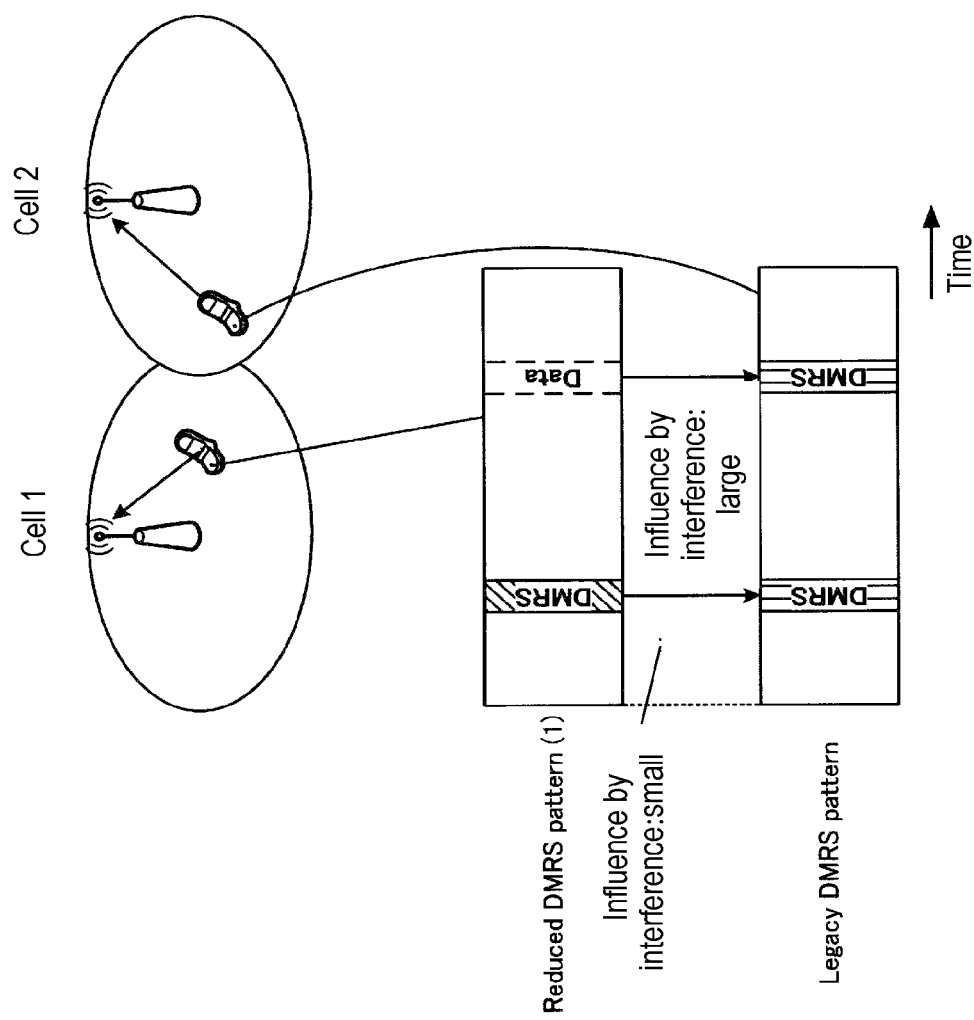
FIG. 6 illustrates interference to another cell at an additional data resource.

FIG. 6 illustrates the state in which the data symbol of the user terminal transmitting the reduced DMRS gives the interference to the DMRS of the user terminal transmitting the legacy DMRS.

As illustrated in FIG. 6, in the same time period in which the PUSCH subframe is transmitted, the user terminal transmits the DMRS using reduced DMRS pattern (1) (see FIG. 4(B)) in cell 1, and another user terminal transmits the DMRS using the legacy DMRS pattern (see FIG. 4(A)) in cell 2. In reduced DMRS pattern (1), a part of the resource on which the DMRS should be mapped using the legacy DMRS pattern is replaced with the data resource. In the following description, the part of the resource replaced with the data resource is referred to as an additional data resource, and the data mapped in the additional data resource is referred to as additional data.

As illustrated in FIG. 6, in the period during which the user terminals of both the cells transmit DMRSs, CAZAC sequences are allocated such that the correlation of the DMRSs is lowered, so that the influence by the interference can be reduced by the averaging and the filtering (influence by interference: small).

On the other hand, as illustrated in FIG. 6, in the period during which the user terminal that uses reduced DMRS pattern (1) transmits the additional data instead of the DMRS, the additional data (data in FIG. 6) of the user terminal in cell 1 causes interference to the DMRS of the user terminal in cell 2. Because the correlation between the additional data in cell 1 and the DMRS in cell 2 is not always small, the additional data transmitted by the user terminal in cell 1 generates a large interference to degrade communication quality of the user terminal in which the legacy DMRS is used in the neighbor cell (cell 2) (influence by interference: large).

Thus, when a user terminal transmits the DMRS using the mapping pattern different from the legacy DMRS, it may cause an interference to the user terminal in the other cell such as the peripheral cell.

The inventors of the present disclosure eagerly have studied the above problem to find the following knowledge, and devised exemplary embodiments of the present disclosure. That is, for the use of a second mapping pattern in which a part of a resource on which the DMRS is to be mapped in a first mapping pattern of the DMRS is replaced with a data resource, the interference to the DMRS of the user terminal of the other cell such as the peripheral cell can be reduced when a transmission power or a transmission power density of second data mapped in the part of the resource is controlled by adding an offset to a transmission power or a transmission power density of first data mapped in the remaining resource.

Hereinafter, each exemplary embodiment of the present disclosure will be described in detail with reference to the drawings. In each exemplary embodiment, the same component is designated by the same numeral, and the overlapping description is neglected.

First Exemplary Embodiment (Outline of Communication System)

Figure 7:
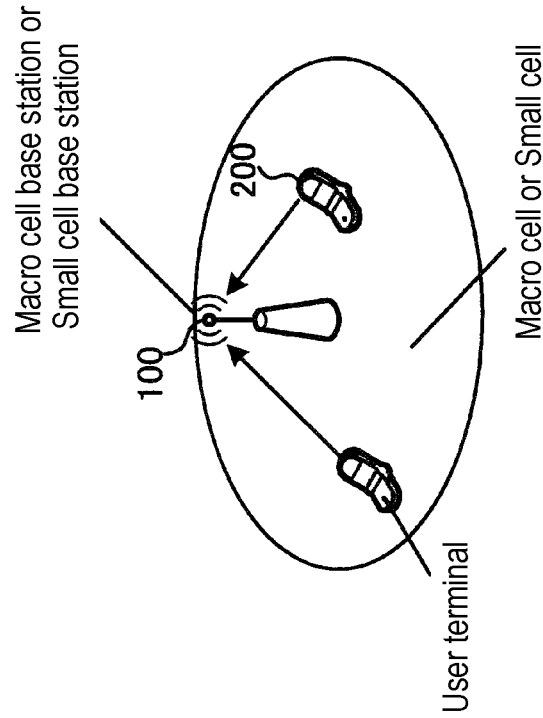
FIG. 7 illustrates a communication system according to a first exemplary embodiment of the present disclosure.

FIG. 7 illustrates a communication system according to a first exemplary embodiment. The communication system in FIG. 7 consists of base station 100 and one or a plurality of user terminals 200 in a cell. In FIG. 7, base station 100 may be a macro cell base station or a small cell base station. The communication system may be a HetNet system including both the macro cell base station and the small cell base station or a CoMP (Coordinated multipoint) system in which a plurality of base stations communicate with the user terminal in a coordinated manner. The macro cell and the small cell may be operated at different frequency bands or at the same frequency band.

[Configuration of Base Station 100]

Figure 8:
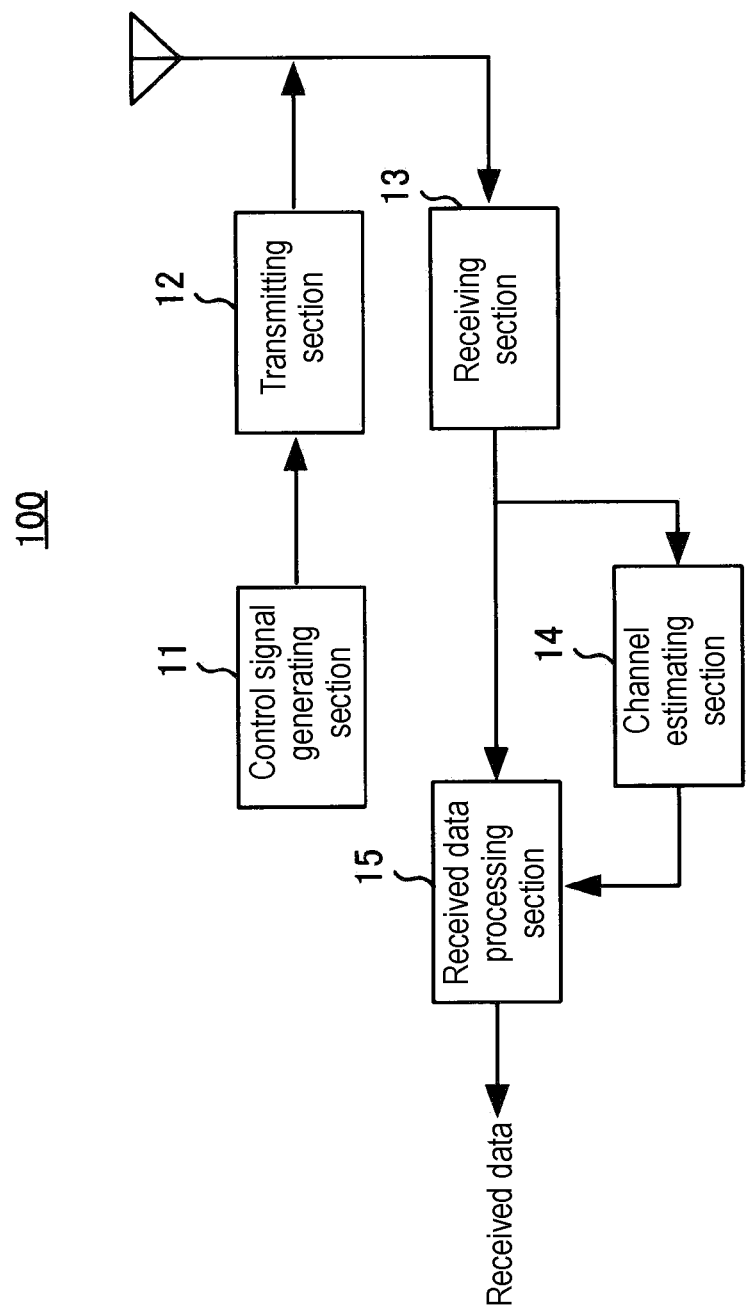
FIG. 8 is a block diagram illustrating a configuration of a main part of a base station according to the first exemplary embodiment of the present disclosure.

FIG. 8 is a block diagram illustrating a main part of base station 100.

Base station 100 in FIG. 8 includes control signal generating section 11, transmitting section 12, receiving section 13, channel estimating section 14, and received data processing section 15.

Base station 100 notifies user terminal 200 of a possibility of instructions to use the reduced DMRS before PUSCH allocation (assignment). The notification may be made by a higher layer. Alternatively, it may be defined that the reduced DMRS is used in the case that a UL grant (uplink grant) is transmitted and received through a specific control channel or a specific configuration. Alternatively, it may be defined that the reduced DMRS is used in the case that the PUSCH is transmitted according to a state of a specific user terminal 200. In such cases, an overhead can be restrained because the notification in the higher layer is unnecessary.

Base station 100 notifies user terminal 200 beforehand of the offset of the transmission power (transmission power density) which is used to transmit the data mapped on the additional data resource (the resource in which the DMRS is replaced with the data) when the use of the reduced DMRS is instructed. The notification of the offset may be made in the higher layer, and its offset amount may be defined beforehand according to the mapping pattern of the reduced DMRS.

Control signal generating section 11 generates a control signal including PUSCH assignment information (UL grant) for user terminal 200, and transmitting section 12 transmits the generated control signal through an antenna. The control signal includes the UL grant instructing the PUSCH allocation. The UL grant consists of a plurality of bits, and includes information for instructing frequency RB (Resource Block) assignment, a MCS (Modulation and Coding Scheme), an SRS (Sounding Reference Signal) trigger, and a TPC (Transmission Power Control) command. The control signal for one or a plurality of user terminals 200 is transmitted using a downlink control channel (PDCCH (Physical downlink control channel) or EPDCCH (Enhanced physical downlink control channel)). Sometimes the EPDCCH is also referred to as an EPDCCH set, and arranged in the PDSCH (Physical downlink shared channel) region as a new control channel different from the PDCCH.

Receiving section 13 receives the PUSCH in a subframe, which is transmitted by user terminal 200 according to the UL grant, through the antenna and retrieves the data and the DMRS. Channel estimating section 14 performs the channel estimation using the DMRS. Received data processing section 15 demodulates and decodes the data based on the estimated channel estimation value.

Figure 9:
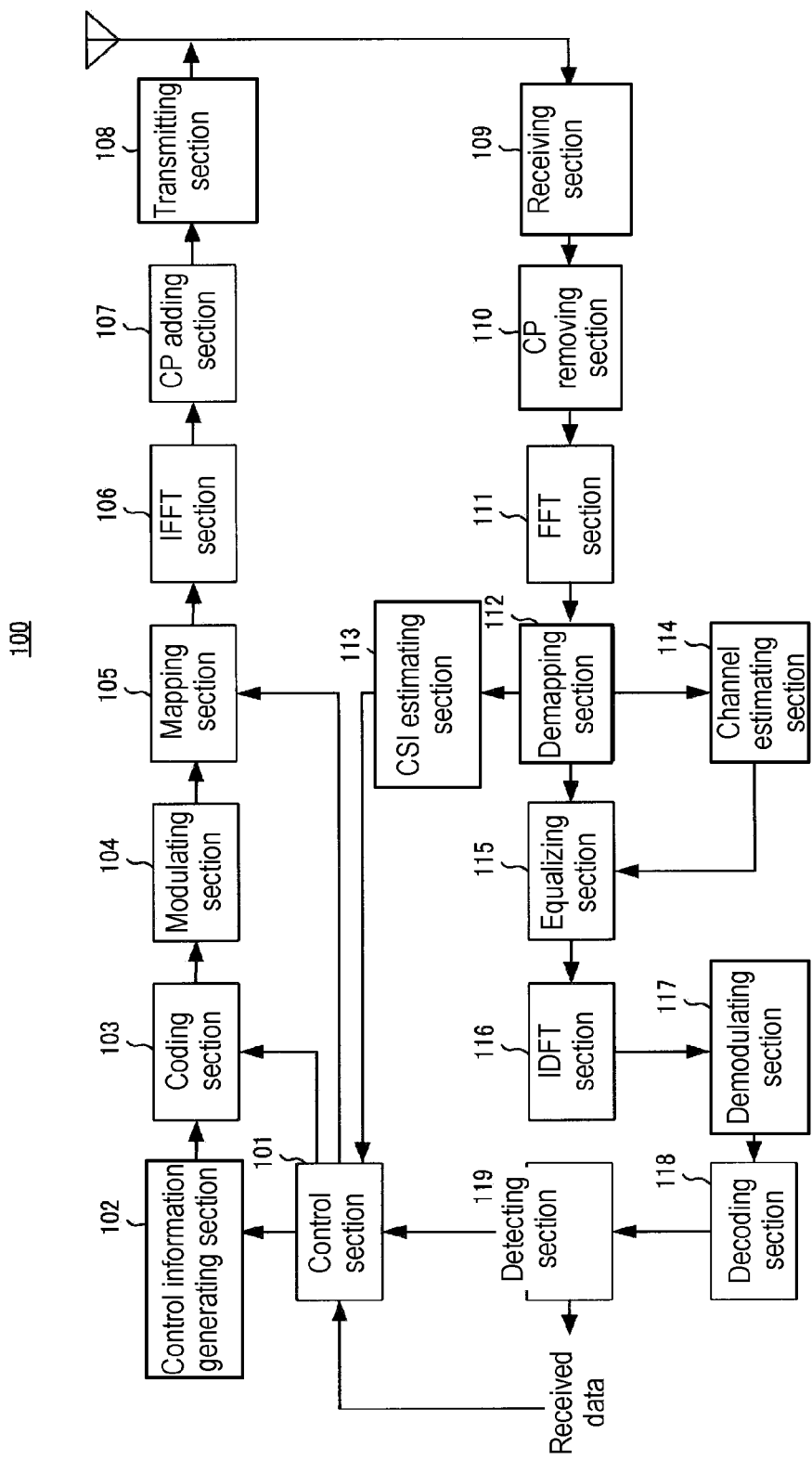
FIG. 9 is a block diagram illustrating a configuration of the base station according to the first exemplary embodiment of the present disclosure.

FIG. 9 is a block diagram illustrating a detailed configuration of base station 100.

Base station 100 in FIG. 9 includes control section 101, control information generating section 102, coding section 103, modulating section 104, mapping section 105, IFFT (Inverse Fast Fourier Transform) section 106, CP (Cyclic Prefix) adding section 107, transmitting section 108, receiving section 109, CP removing section 110, FFT (Fast Fourier Transform) section 111, demapping section 112, CSI (Channel State Information) estimating section 113, channel estimating section 114, equalizing section 115, IDFT (Inverse Discrete Fourier Transform) section 116, demodulating section 117, decoding section 118, and detecting section 119.

Control section 101, control information generating section 102, coding section 103, and modulating section 104 act mainly as control signal generating section 11 (see FIG. 8). Mapping section 105, IFFT section 106, CP adding section 107, and transmitting section 108 act mainly as transmitting section 12 (see FIG. 8). Receiving section 109, CP removing section 110, FFT section 111, and demapping section 112 act mainly as receiving section 13 (see FIG. 8). Channel estimating section 114 acts as channel estimating section 14. Equalizing section 115, IDFT section 116, demodulating section 117, decoding section 118, and detecting section 119 act mainly as received data processing section 15 (see FIG. 8).

In base station 100 in FIG. 9, control section 101 determines the allocation of the PUSCH subframe to user terminal 200 according to the condition or a reception state of user terminal 200. For example, control section 101 determines the allocation of the PUSCH subframe to user terminal 200 based on a detection result (existence or non-existence of an error, ACK or NACK) input from detecting section 119 with respect to the received data of user terminal 200 and Channel State Information (CSI) input from CSI estimating section 113 with respect to user terminal 200. At this point, control section 101 determines frequency Resource Block (RB) assignment information instructed to user terminal 200, a coding method, a modulating method, information indicating one of initial transmission or re-transmission, a process number of a hybrid automatic repeat request (HARM), and the DMRS pattern, and outputs the decided information to control information generating section 102.

Control section 101 also determines a coding level for the control signal transmitted to user terminal 200, and outputs the decided coding level to coding section 103. The coding level is decided according to an amount of control information included in the control signal to be transmitted or the state of user terminal 200.

Control section 101 also determines a resource element (RE) in which the control signal transmitted to user terminal 200 is mapped, and instructs the decided RE to mapping section 105.

Control information generating section 102 generates a control information bit sequence using the control information to be transmitted to user terminal 200, which is input from control section 101, and outputs the generated control information bit sequence to coding section 103. Because sometimes the control information is transmitted to the plurality of user terminals, control information generating section 102 generates the bit sequence while a terminal ID of each user terminal 200 is included in the control information transmitted to each user terminal. For example, a CRC bits (Cyclic Redundancy Check bits) masked by the terminal ID of destination user terminal 200 is added to the control information bit sequence.

Using the coding level instructed by control section 101, coding section 103 codes the control information bit sequence input from control information generating section 102. Coding section 103 outputs the obtained coded bit sequence to modulating section 104.

Modulating section 104 modulates the coded bit sequence input from coding section 103, and outputs the obtained symbol sequence to mapping section 105.

Mapping section 105 maps the control signal, which is input as a symbol sequence from modulating section 104, in the resource element instructed by control section 101. The control channel that is a mapping target of the control signal may be the PDCCH or the EPDCCH. Mapping section 105 inputs the signal of the downlink subframe including the PDCCH or EPDCCH on which the control signal is mapped, to IFFT section 106.

IFFT section 106 applies the IFFT to the downlink subframe input from mapping section 105 to transform a frequency-region signal sequence into a time-domain signal having a time waveform. IFFT section 106 outputs the time-domain signal having the time waveform to CP adding section 107.

CP adding section 107 adds a CP (Cyclic Prefix) to the time-domain signal having the time waveform, which is input from IFFT section 106, and outputs the signal to which the CP is added to transmitting section 108.

Transmitting section 108 performs transmission processing such as digital-analog conversion and upconversion to the signal input from CP adding section 107, and transmits the post-transmission processing signal to user terminal 200 through the antenna.

Receiving section 109 receives the uplink signal (PUSCH) transmitted from user terminal 200 through the antenna, performs reception processing such as downconversion and analog-digital conversion to the received signal, and outputs the post-reception processing signal to CP removing section 110.

CP removing section 110 removes the waveform corresponding to the CP from the signal (the time-domain signal having the time waveform) input from receiving section 109, and outputs the post-CP removal time-domain signal to FFT section 111.

FFT section 111 applies the FFT to the time-domain signal input from CP removing section 110, transforms the time-domain signal into the frequency-region signal sequence (subcarrier-unit frequency element) and retrieves the signal corresponding to the PUSCH subframe. FFT section 111 outputs the obtained signal to demapping section 112.

Demapping section 112 extracts a PUSCH subframe allocated to user terminal 200 from the input signal. Demapping section 112 resolves the extracted PUSCH subframe into the DMRS and the data symbol (SC-FDMA data symbol), outputs the DMRS to channel estimating section 114, and outputs the data symbol to equalizing section 115. In the case that user terminal 200 transmits a sounding reference signal (SRS) in the PUSCH subframe, demapping section 112 extracts the SRS, and outputs the extracted SRS to CSI estimating section 113. In the case that the SRS is transmitted, because the final data symbol of the PUSCH subframe is replaced with the SRS, demapping section 112 may separate the SRS and the data symbol from each other.

In the case that the SRS is input from demapping section 112, CSI estimating section 113 measures the CSI using the SRS. CSI estimating section 113 outputs the obtained CSI measurement result to control section 101.

Channel estimating section 114 performs the channel estimation using the DMRS input from demapping section 112. Channel estimating section 114 outputs the obtained channel estimation value to equalizing section 115.

Using the channel estimation value input from channel estimating section 114, equalizing section 115 equalizes the SC-FDMA data symbol input from demapping section 112. Equalizing section 115 outputs the equalized SC-FDMA data symbol to IDFT section 116.

IDFT section 116 applies the IDFT corresponding to the allocated bandwidth to the equalized SC-FDMA data symbol input from equalizing section 115, and transforms the equalized SC-FDMA data symbol into the time-domain signal. IDFT section 116 outputs the obtained time-domain signal to demodulating section 117.

Demodulating section 117 performs data demodulation to the time-domain signal input from IDFT section 116. Specifically, demodulating section 117 transforms the symbol sequence into the bit sequence based on the modulation method instructed to user terminal 200, and outputs the obtained bit sequence to decoding section 118.

Decoding section 118 performs error correction decoding to the bit sequence input from demodulating section 117, and outputs the decoded bit sequence to detecting section 119.

Detecting section 119 performs error detection to the demodulated bit sequence input from decoding section 118. The error detection is performed using the CRC bit added to the bit sequence. When the error does not exist in the CRC bit judgment result, detecting section 119 takes out the received data, and notifies control section 101 of the ACK. On the other hand, when the error exists in the CRC bit judgment result, detecting section 119 notifies control section 101 of the NACK.

[Configuration of User Terminal 200]

Figure 10:
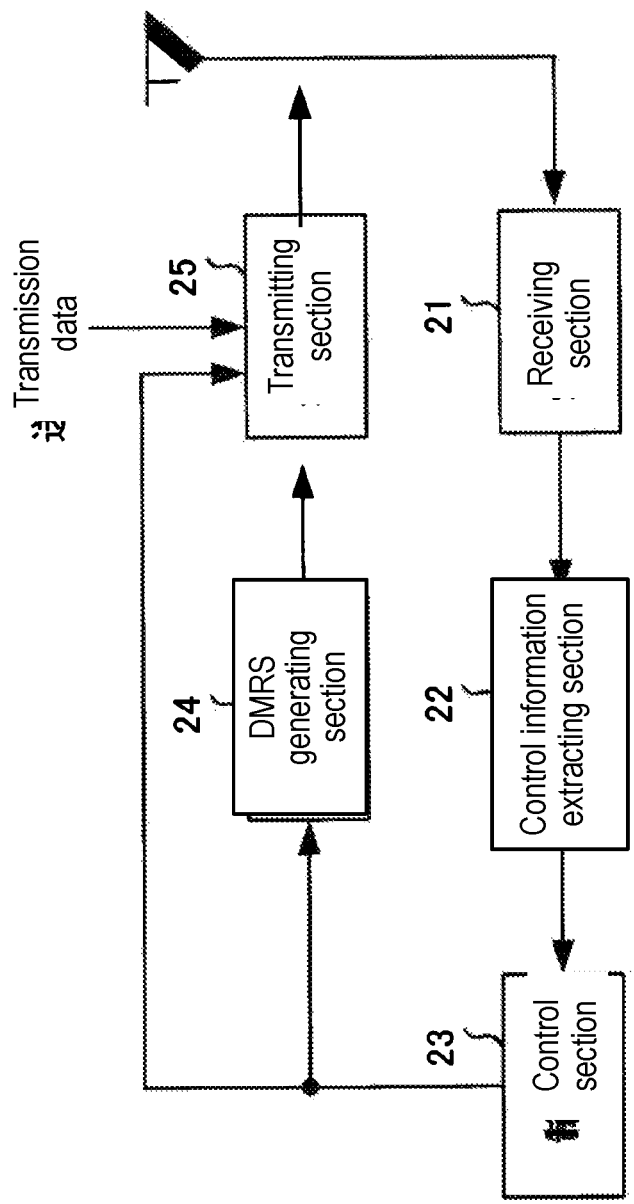
FIG. 10 is a block diagram illustrating a configuration of a main part of a user terminal according to the first exemplary embodiment of the present disclosure.

FIG. 10 is a block diagram illustrating a main part of user terminal 200.

User terminal 200 in FIG. 10 includes receiving section 21, control information extracting section 22, control section 23, DMRS generating section 24, and transmitting section 25.

User terminal 200 is notified beforehand of a possibility of instructions to use the reduced DMRS before the PUSCH subframe is transmitted. The notification may be made in the higher layer from base station 100. Alternatively, it may be defined that the reduced DMRS is used in the case that the UL grant is transmitted or received by a specific control channel or a specific configuration. Alternatively, it may be defined that the reduced DMRS is used in the case that the PUSCH is transmitted according to the state of specific user terminal 200. In such cases, the overhead can be avoided because the necessity of the notification in the higher layer is eliminated.

Receiving section 21 receives the control signal (UL grant) transmitted to user terminal 200 in the PDCCH or the EPDCCH, and control information extracting section 22 retrieves information on the allocation of the PUSCH subframe from the control signal. Specifically, control information extracting section 22 performs blind decoding of a control signal allocation candidate in the previously-set control channel. When it successfully decoded the control signal to which the CRC bits masked by the terminal ID of user terminal 200 are added, control signal is extracted as the control information addressed to user terminal 200. The control information includes the frequency RB assignment information, the modulating method, the information indicating the initial transmission or the re-transmission, the HARQ process number, an A-SRS trigger (Aperiodic SRS trigger) and the TPC command.

Control section 23 determines the configuration of the PUSCH subframe based on the extracted control information (UL grant). Control section 23 sets the transmission power similar to that before Rel.11 in the case that the DMRS used to transmit the PUSCH subframe is the legacy DMRS. On the other hand, in the case that the DMRS used to transmit the PUSCH subframe is the reduced DMRS, control section 23 controls the transmission power (transmission power density) of the data mapped in the additional data resource by adding the offset to the transmission power (transmission power density) of the data mapped in the resource except the additional data resource. Specifically, in the additional data resource, control section 23 sets the transmission power (transmission power density) smaller than that in another resource using the negative offset. DMRS generating section 24 generates the DMRS according to the instruction from control section 23. Transmitting section 25 transmits the signal of the PUSCH subframe including the DMRS according to the instruction from control section 23.

That is, control section 23 performs the following processing in the case of the use of the Reduced DMRS pattern (second mapping pattern) in which a part of the resource, on which the DMRS is to be mapped in the legacy DMRS pattern (the first mapping pattern of the DMRS), is replaced with the additional data resource. Control section 23 controls the transmission power (transmission power density) of the additional data (second data) mapped in the part of the resource by adding the offset to the transmission power (transmission power density) of the data (first data) mapped in the resource expect the part of the resource. Transmitting section 25 transmits the signal including the first data, the second data, and the DMRS.

Figure 11:
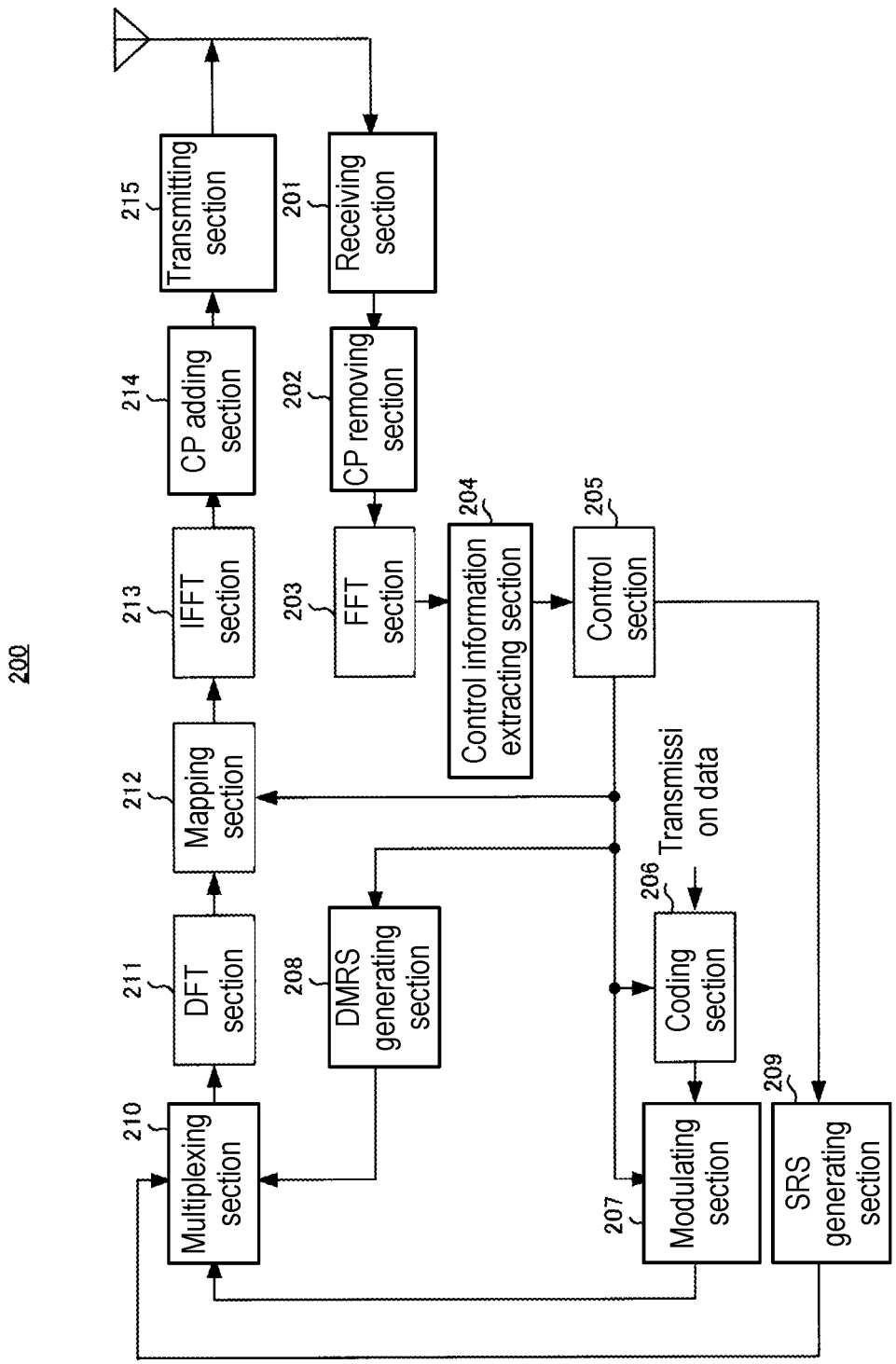
FIG. 11 is a block diagram illustrating a configuration of the user terminal according to the first exemplary embodiment of the present disclosure.

FIG. 11 is a block diagram illustrating a detailed configuration of user terminal 200.

User terminal 200 in FIG. 11 includes receiving section 201, CP removing section 202, FFT section 203, control information extracting section 204, control section 205, coding section 206, modulating section 207, DMRS generating section 208, SRS generating section 209, multiplexing section 210, DFT (Discrete Fourier Transform) section 211, mapping section 212, IFFT section 213, CP adding section 214, and transmitting section 215.

Receiving section 201, CP removing section 202, and FFT section 203 act mainly as receiving section 21 (see FIG. 10). Coding section 206, modulating section 207, SRS generating section 209, multiplexing section 210, DFT section 211, mapping section 212, IFFT section 213, CP adding section 214, and transmitting section 215 act mainly as transmitting section 25 (see FIG. 10). Control information extracting section 204 acts as control information extracting section 22, and control section 205 acts as control section 23. DMRS generating section 208 acts as DMRS generating section 24.

In user terminal 200 in FIG. 11, receiving section 201 receives the control signal (PDCCH or EPDCCH) which is transmitted from base station 100 (see FIG. 9), through the antenna. Receiving section 201 performs the reception processing such as the downconversion and the analog-digital conversion to the control signal, and outputs the post-reception processing control signal to CP removing section 202.

CP removing section 202 removes the CP from the signal of the downlink subframe including the PDCCH or the EPDCCH in the control signal input from receiving section 201, and outputs the post-CP removal signal to FFT section 203.

FFT section 203 applies the FFT to the signal (downlink subframe) input from CP removing section 202, and transforms the signal into the frequency-region signal. FFT section 203 outputs the frequency-region signal to control information extracting section 204.

Control information extracting section 204 tries to decode the control signal by performing the blind decoding to the frequency-region signal input from FFT section 203. The CRC bit masked by the terminal ID of user terminal 200 is added to the control signal addressed to user terminal 200. Accordingly, when the positive CRC judgment is made as a result of the blind decoding, control information extracting section 204 extracts the control signal, and outputs the control signal to control section 205.

Control section 205 controls the transmission of the PUSCH subframe based on the control signal input from control information extracting section 204.

Specifically, control section 205 instructs mapping section 212 about the RB assignment during the transmission of the PUSCH subframe based on the frequency RB assignment information on the PUSCH, which is included in the control signal. Based on the information on the coding method and the modulation method, which are included in the control signal, control section 205 instructs coding section 206 and modulating section 207 about the coding method and the modulation method during the transmission of the PUSCH. Based on the SRS trigger included in the control signal, control section 205 instructs SRS generating section 209 about whether the SRS is transmitted after a given time goes on. Sometimes the SRS instructed by the SRS trigger is transmitted while multiplexed in the PUSCH subframe instructed by the UL grant, or sometimes the SRS is transmitted in the time period after the PUSCH subframe.

Control section 205 controls the transmission power (transmission power density) of each signal (data signal and DMRS) in the PUSCH subframe. Specifically, control section 205 controls the transmission power of the PUSCH subframe based on the TPC command included in the control signal and the DMRS pattern used to transmit the PUSCH subframe. For example, in a case that the reduced DMRS is used during the transmission of the PUSCH subframe, control section 205 determines the transmission power (transmission power density) of the DMRS in the additional data resource using the offset of which base station 100 notifies control section 205 through the higher layer. The detailed control of the transmission power of the PUSCH subframe is described later.

Coding section 206 performs error correction coding by adding the CRC bit masked by the terminal ID to the input transmission data. A coding rate and a codeword length, which are used in coding section 206, are instructed by control section 205. Coding section 206 outputs the coded bit sequence to modulating section 207.

Modulating section 207 modulates the bit sequence input from coding section 206. Control section 205 instructs a modulation level (that is, M-ray value) used in modulating section 207. Modulating section 207 outputs the modulated data symbol sequence to multiplexing section 210.

DMRS generating section 208 generates the DMRS according to the DMRS pattern instructed by control section 205, and outputs the DMRS to multiplexing section 210.

SRS generating section 209 generates the SRS according to the instruction from control section 205, and outputs the SRS to multiplexing section 210. The timing of transmitting the SRS is not always identical to that of the PUSCH subframe instructed by the UL grant.

Multiplexing section 210 multiplexes the data symbol sequence, the DMRS, and the SRS, which are input from modulating section 207, DMRS generating section 208, and SRS generating section 209, and outputs the multiplexed signal to DFT section 211.

DFT section 211 applies the DFT to the signal input from multiplexing section 210, resolves the signal into frequency-component signals in units of subcarriers, and outputs the obtained frequency-component signal to mapping section 212.

According to the instruction from control section 205, mapping section 212 maps the signal (that is, the data symbol sequence, the DMRS, and the SRS) input from DFT section 211 in the time and frequency resources of the allocated PUSCH subframe. Mapping section 212 outputs the signal of the PUSCH subframe to IFFT section 213.

IFFT section 213 applies the IFFT to the frequency-region signal of the PUSCH subframe input from mapping section 212, and transforms the frequency-region signal into the time-domain signal. IFFT section 213 outputs the obtained time-domain signal to CP adding section 214.

CP adding section 214 adds the CP to the time-domain signal input from IFFT section 213 in each output unit of IFFT section 213, and outputs the post-CP addition signal to transmitting section 215.

Transmitting section 215 performs the transmission processing such as the digital-analog conversion and the upconversion to the signal input from CP adding section 214, and transmits the post-transmission processing signal to base station 100 through the antenna. The signal of the PUSCH subframe is transmitted with the transmission power controlled by control section 205.

[Operation]

Processing flows of base station 100 and user terminal 200 of the first exemplary embodiment will be described in steps (1) to (4).

Step (1): Base station 100 notifies user terminal 200 of a possibility of instructions to use the reduced DMRS, before the PUSCH subframe is transmitted and received. The use of the reduced DMRS may semi-statically be instructed by the notification through the higher layer, or dynamically be instructed using a control bit included in the control signal such as the UL grant.

In the case that the dynamic instruction can be performed, for example, spatial multiplexing with the user terminal that supports the function before Rel.11 can be performed by causing user terminal 200 to use the legacy DMRS, or the overhead can be reduced by causing user terminal 200 to use the reduced DMRS. The scheduler enables the DMRS to be switched more flexibly. Therefore, the cell throughput and the terminal throughput can simultaneously be improved. A plurality of patterns are previously set to the reduced DMRS, and one pattern may semi-statically or dynamically be instructed from the plurality of patterns.

During the use of the reduced DMRS, base station 100 notifies user terminal 200 of a power (power density) offset used to set the transmission power (transmission power density) of the additional data resource.

The notification to user terminal 200 in step (1) may be made by base station 100 that transmits and receives the PUSCH in a subframe or another base station 100 except base station 100 that transmits and receives the PUSCH in a subframe. For example, base station 100 that transmits and receives the PUSCH in a subframe may be the small cell base station, and the base station that makes the notification in step (1) may be the macro cell base station.

Step (2): Base station 100 transmits the control signal (UL grant) to user terminal 200 through the PDCCH or the EPDCCH to instruct the PUSCH allocation. The UL grant includes the allocated bandwidth of the PUSCH, the MCS level, and the control bit that issues the TPC command.

Step (3): User terminal 200 obtains the control signal (UL grant) addressed to own user terminal by performing the blind decoding to the PDCCH or EPDCCH received in step (2). In the case that the reduced DMRS is instructed with respect to the transmission of the PUSCH subframe instructed using the UL grant, user terminal 200 (control section 205) performs the transmission power control to the additional data resource in addition to the normal transmission power control (control performed to the legacy DMRS).

In the transmission power control performed of the additional data resource, the offset of a negative transmission power (transmission power density) is provided to the normal transmission power. Specifically, in the case that the reduced DMRS is used, user terminal 200 adds the offset to the transmission power (transmission power density) of the data mapped in the resource except the additional data resource, and controls the transmission power (transmission power density) of the data mapped in the additional data resource.

In the case that a negative power offset (minus X) is added to the additional data resource, for example, a transmission power P of the additional data resource is expressed by the following equation.

$$\tilde{P}=\min\{P_{CMAX}, 10\log_{10}(M)+P(j)+\alpha(j)\cdot PL+\Delta_{TF}+f-X\} \text{ [dBm]} \quad (1)$$

Where $P_{CMAX}$ indicates a maximum allowable transmission power of user terminal 200, M indicates an RB number (that is, allocated bandwidth) assigned to user terminal 200, P(j) {j=0, 1, 2} indicates a power offset amount of which user terminal 200 is notified by the higher layer, α(j) {j=0, 1, 2} indicates a path loss compensation coefficient taking a value of 0 to 1, and PL indicates a path loss measurement value from the connected cell to user terminal 200. $\Delta_{TF}$ indicates a power offset value decided according to the MCS level, and f indicates an accumulated value of the TPC command. X indicates the power offset amount with respect to the additional data resource.

For X=0, the transmission power P of the additional data resource equals the transmission power in the portion except the additional data resource, and is identical to the transmission power equation before Rel.11.

Figure 12:
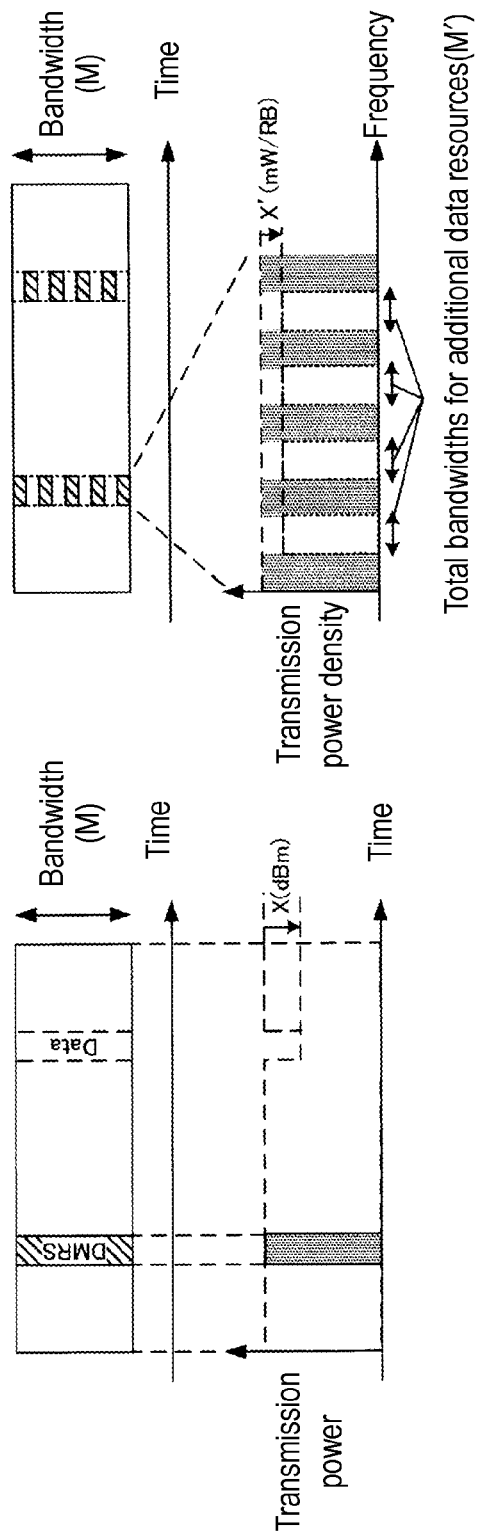
FIGS. 12(A) and 12(B) illustrate offsets of transmission power and transmission power density according to the first exemplary embodiment of the present disclosure.

FIG. 12(A) illustrates the transmission power in the case that reduced DMRS pattern (1) is used. As illustrated in FIG. 12(A), in the additional data resource, the transmission power is set lower than that of another resource by X [dBm]. That is, user terminal 200 (control section 205) sets a value which is acquired by adding the negative power offset (−X) to the transmission power of the data mapped in another resource, as the transmission power of the data (additional data) mapped in the additional data resource.

On the other hand, in the case that the power density offset is added to the additional data resource, for example, the transmission power $\tilde{P}$ of the additional data resource is expressed by the following equation.

$$\tilde{P}=\min\{P_{CMAX}, 10\log_{10}(M)+P(j)+\alpha(j)\cdot PL+\Delta_{TF}+f-10\log_{10}(M'X')\} \text{ [dBm]} \quad (2)$$

X' indicates a power density offset [mW/RB], and M' indicates a bandwidth of the additional data resource in the allocated PUSCH bandwidth (M).

FIG. 12(B) illustrates the transmission power density in the case that reduced DMRS pattern (3) is used. As illustrated in FIG. 12(B), in the bandwidth corresponding to the additional data resource, the transmission power density is set lower than that of another resource by X' [mw/RB]. That is, user terminal 200 (control section 205) sets the value which is acquired by adding the negative power density offset (−X') to the transmission power density of the data mapped in another resource, as the transmission power density of the data (additional data) mapped in the additional data resource.

In equation (1), the power offset amount of user terminal 200 is kept constant, while the power density offset amount changes according to the allocated bandwidth. On the other hand, in equation (2), the power offset amount of user terminal 200 changes according to the allocated bandwidth, while the power density offset amount is kept constant.

Step (4): Base station 100 receives the PUSCH transmitted by user terminal 200 in step (3), and performs the channel estimation based on the DMRS extracted from the PUSCH subframe. Base station 100 equalizes, demodulates, and decodes the data symbol using the obtained channel estimation value.

In the case that it is detected that the data is correctly decoded, base station 100 transmits the ACK to user terminal 200 to encourage user terminal 200 to transmit the next data. In the case that it is detected that the data decoding result includes an error, base station 100 transmits the NACK to user terminal 200 to encourage NACK to retransmit the HARQ.

[Effect]

As described above, for the use of the reduced DMRS pattern in which a part of the resource on which the DMRS is to be mapped in the legacy DMRS pattern is replaced with the data resource, user terminal 200 sets the transmission power of the resource (additional data resource) in which the DMRS is replaced with the data to the transmission power lower than that of the resource except the additional data resource.

The legacy DMRS is used by a user terminal in the poor channel condition (or a user terminal that requires the high channel estimation accuracy) such as the user terminal located at the end of the cell and the user terminal moving at high speed. Therefore, user terminal 200 that uses the reduced DMRS can reduce the interference to another user terminal that uses the legacy DMRS by decreasing the transmission power of the additional data resource corresponding to the DMRS resource in the legacy DMRS. Therefore, the data rate can be enhanced using the additional data resource in user terminal 200 that uses the reduced DMRS. At the same time, the interference caused in the DMRS by the additional data resource can be reduced to another user terminal that uses the legacy DMRS in the other cell such as the peripheral cell. According to first exemplary embodiment, the influence by the interference caused by the user terminal of the other cell such as the peripheral cell can be reduced in the case that the DMRS is transmitted using the reduced DMRS that is of a DMRS pattern different from the legacy DMRS.

In the first exemplary embodiment in the reduced DMRS pattern, only the transmission power of the additional data resource in which the DMRS is replaced with the data is set lower than that of another resource. That is, because the transmission power of the DMRS mapped on the resource except the additional data resource is not reduced, the channel estimation accuracy and a communication capacity of user terminal 200 are not degraded. Accordingly, a communication speed of user terminal 200 that uses the reduced DMRS can be enhanced without degrading the communication quality of the user terminal that uses the legacy DMRS in the other cell such as the peripheral cell.

In the case that the fixed power offset is used like equation (1), the power density offset amount changes according to the allocated bandwidth of the PUSCH. That is, the power density offset amount decreases as the allocated bandwidth (or the allocated bandwidth of the additional data resource) gets wider. At this point, the wideband resource or more resources are allocated to the additional data in the case of the short distance between user terminal 200 and base station 100 or the good channel condition. In such cases, the distance between user terminal 200 and another cell relatively becomes farther, and the interference to another cell caused by the additional data of user terminal 200 decreases. Therefore, even if the power density offset amount (that is, a degree of the decrease in transmission power density) decreases, the interference to another user terminal of another cell do not matter, and there is a benefit that the demodulation accuracy is improved by the decrease in power density offset amount.

In the case that the fixed power density offset is used like equation (2), the power offset amount changes according to the allocated bandwidth of the PUSCH. At this point, the coverage of the transmission signal is decided by the transmission power density. Therefore, the interference to another user terminal in the other cell by the additional data of user terminal 200 does not depend on the allocated bandwidth by the use of the fixed power density offset.

User terminal 200 can perform an operation to change the transmission power at a time point of the SC-FDMA symbol before and after the additional data resource instead of only making the transmission power of the additional data resource differ from that of another resource. Therefore, degradation of the transmission quality caused by overlapping of an unstable interval of the transmission power in association with a power transition with an additional data resource interval can be avoided.

[First Variation]

In a first variation, the DMRS pattern during the transmission of the PUSCH and the power (power density) offset amount X of the additional data resource are notified by the control bit (DPI (DMRS Pattern Indicator)) instructing the DMRS pattern included in the UL grant.

That is, base station 100 can simultaneously instruct the DMRS pattern and the power (power density) offset amount by notifying user terminal 200 of the DPI. At this point, base station 100 notifies beforehand user terminal 200 of one or a plurality of power (power density) offset amounts using the higher layer. For example, the a plurality of DMRS patterns of which base station 100 can notify user terminal 200 by the DPI include the legacy DMRS pattern and the reduced DMRS patterns. Base station 100 notifies beforehand user terminal 200 of these DMRS pattern candidates using the higher layer.

User terminal 200 receives the DPI instructing the DMRS pattern used by user terminal 200 among a plurality of DMRS patterns and the power (power density) offset amount, determines the DMRS pattern corresponding to the value of the DPI, and controls the transmission power (transmission power density) of the additional data resource using the offset amount corresponding to the value of the DPI. FIG. 13 illustrates an example of a correspondence relationship among the DPI, the DMRS pattern, and the power offset amount X. Although the power offset amount [dBm] is correlated in FIG. 13, the power density offset amount may be correlated instead of the power offset amount.

The proper DMRS pattern of the reduced DMRS depends on the situation or the interference state of user terminal 200. Accordingly, it is considered that a plurality of DMRS patterns are dynamically switched with respect to user terminal 200. On the other hand, the proper power (power density) offset amount depends on the DMRS pattern. Accordingly, the more flexible and proper power offset can be provided in each DMRS pattern by simultaneously switching the DMRS pattern and the power (power density) offset amount according to the value of the DPI. The necessity of the additional control bit instructing the offset is eliminated by making the notification of the offset using the DPI instructing the DMRS pattern. Therefore, the increase in overhead is not generated.

Because four kinds of combinations can be set in the DPI (2 bits) in FIG. 13, the plurality of power (power density) offsets can also be set to the same DMRS pattern. Therefore, different offsets can be set according to the state of user terminal 200 or the state of the interference caused in another cell even if the same DMRS pattern is used. For example, the offset can dynamically be set such that the offset is decreased for important data, and such that the offset is increased for a subframe in which the interference to another cell is reduced.

[Second Variation]

In a second variation, user terminal 200 changes the power (power density) offset amount (an absolute value of the offset) in the additional data resource according to the allocated bandwidth of the PUSCH instructed by the UL grant.

Figure 14:
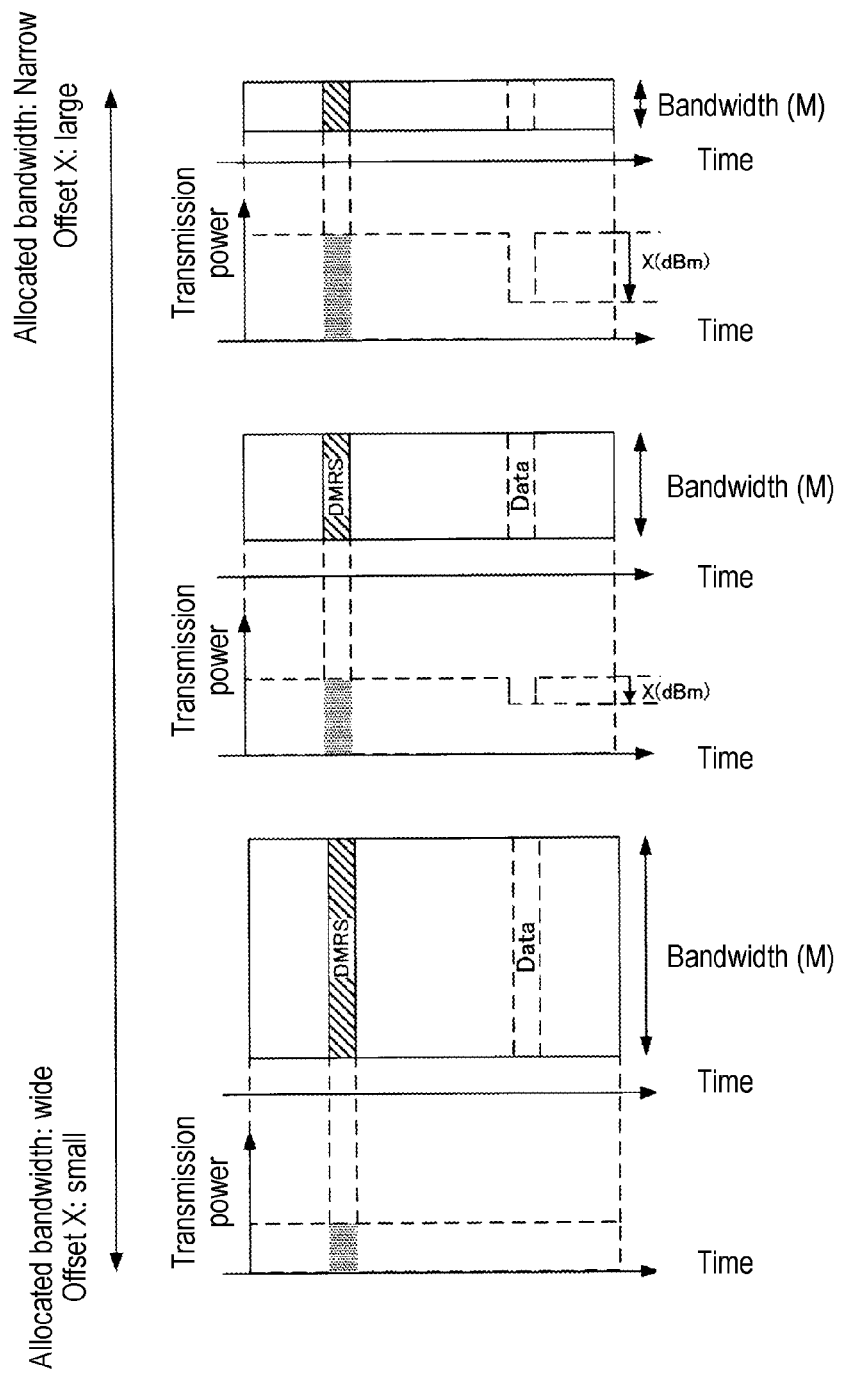
FIG. 14 illustrates transmission power control using the offset according to an allocated bandwidth according to the first exemplary embodiment of the present disclosure.

For example, as illustrated in FIG. 14, the offset amount is decreased for the wideband allocation, and the offset amount is increased for the narrowband allocation. That is, the power offset value (or power density offset value) decreases with increasing bandwidth allocated to the PUSCH.

The correspondence relationship between the allocated bandwidth and the offset amount may be defined by a table or a mathematical expression. FIG. 15 illustrates an example of the case that the power offset amount X [dBm] corresponding to each allocated bandwidth (the assigned RB number of the PUSCH) is provided by a table. In FIG. 15, $N_{RB}^{UL}$ indicates an uplink system bandwidth.

Following equation (3) provides an example of a case when the power offset amount X [dBm] is provided by the mathematical expression.

$$X = \max\{P_{min}, x \cdot (N_{RB}^{UL} - M)\} \quad (3)$$

Where $P_{min}$ indicates the minimum transmission power of user terminal 200, and x is a specified value or a value made by the notification through the higher layer and indicates a coefficient of the transmission power offset that is inversely proportional to the allocated bandwidth.

Although FIG. 15 and equation (3) indicate the case of the power offset, the power offset may be replaced with the power density offset.

The wideband is allocated by the UL grant in a case when a distance between user terminal 200 and a receiving station (for example, base station 100) is extremely good or the channel condition is extremely good. In such cases, the distance between user terminal 200 and another cell such as the peripheral cell relatively becomes farther, and the interference to another cell by the additional data of user terminal 200 decreases. Therefore, a large influence is not given to the other cell even if the offset amount of the transmission power (transmission power density) in the additional data resource is decreased in a case that the wideband is allocated to user terminal 200. On the other hand, the larger power can be allocated to the additional data resource of the user terminal by decreasing the offset amount of the transmission power (transmission power density) in the additional data resource, so that the data of the additional data resource can be transmitted and received with high quality.

It is considered that the narrow bandwidth is allocated by the UL grant in a case when a distance between user terminal 200 and another cell is short. In this case, the interference to another cell by the additional data by user terminal 200 increases. Therefore, in the case that the narrow bandwidth is allocated to user terminal 200, the interference to the peripheral cell can be reduced by increasing the offset of the transmission power (transmission power density) in the additional data resource.

Thus, both the improvement of the communication quality of user terminal 200 and the reduction of the interference to the other cell can be implemented by setting the offset according to an environment of user terminal 200.

[Third Variation]

In the first exemplary embodiment, the transmission power (transmission power density) of the additional data resource is set lower than that of another resource using the offset. On the other hand, in a third variation, the transmission power (transmission power density) of the additional data resource is set to zero (that is, no transmission of data) using an offset, and the transmission power (transmission power density) of the additional data resource is set higher than that of another resource.

The power offset amount X that zeros the transmission power of the additional data mapped on the additional data resource is expressed by equation (4). The power offset amount X that sets the transmission power of the additional data mapped on the additional data resource to a transmission power higher than that of the data mapped on the resource except the additional data resource is expressed by equation (5).

$$X = 10 \log_{10}(M) + P(j) + \alpha(j) \cdot PL + \Delta_{TF} + f \quad (4)$$

$$X < 0 \quad (5)$$

That is, user terminal 200 (control section 205) controls the transmission power of the additional data by substituting the power offset X indicated in equation (4) or (5) for the transmission power of the data mapped on the resource except the additional data resource in equation (1).

Figure 16:
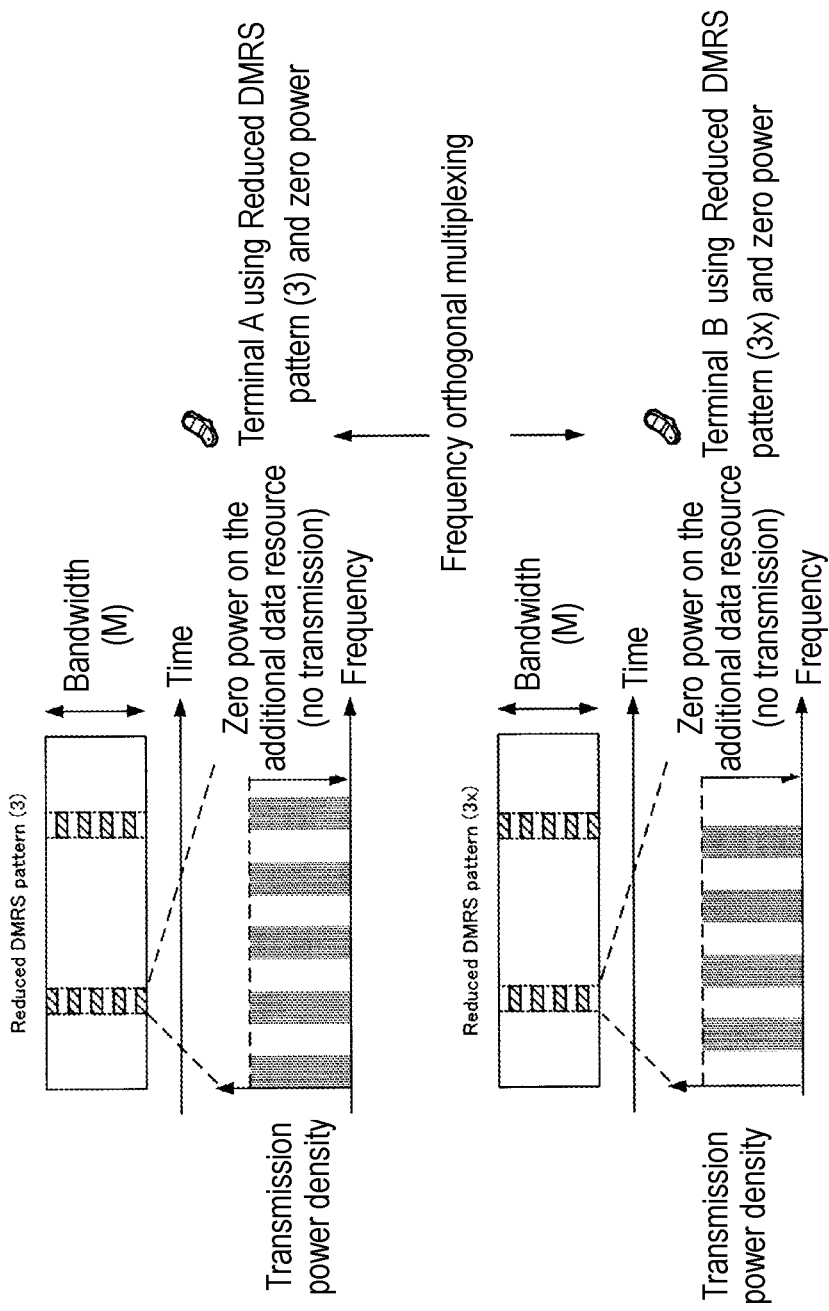
FIG. 16 illustrates the orthogonal multiplexing in a frequency region according to the first exemplary embodiment of the present disclosure.

Using the offset X in equation (4), user terminal 200 zeros the transmission power of the additional data resource. Therefore, the interference to another cell such as a peripheral cell can be minimized. For example, the reduced DMRSs of the user terminals can orthogonally multiplexed in the time or frequency region by properly combining the transmission power control with zero power and the setting of the reduced DMRS pattern between the user terminals. FIG. 16 illustrates an example in which the DMRSs of the two user terminals are orthogonally multiplexed in the frequency region. Referring to FIG. 16, in a user terminal A, reduced DMRS pattern (3) (see FIG. 4D) is instructed, and the transmission power of the additional data resource is set to zero. On the other hand, in a user terminal B, reduced DMRS pattern (3x) is instructed, and the transmission power of the additional data resource is set to zero. Reduced DMRS pattern (3x) is identical to reduced DMRS pattern (3) in that the DMRS having the sequence length shorter than the allocated bandwidth is distributed-mapped in the SC-FDMA symbol. However, the DMRS in reduced DMRS pattern (3x) is orthogonal to the DMRS in reduced DMRS pattern (3) in the frequency region. That is, in FIG. 16, the data of one of the user terminals is not allocated to the frequency bandwidth in which the DMRS of the other user terminal is allocated.

Thus, the enhancement of the data rate of the user terminal because of the reduction of the overhead and the orthogonal multiplexing of the DMRSs of the a plurality of user terminals because of the decreased number of DMRS resources can flexibly be implemented by setting the two parameters of the power offset and the reduced DMRS pattern.

In FIG. 16, the DMRSs of a plurality of user terminals are orthogonally multiplexed in the frequency region. Alternatively, the DMRSs of a plurality of user terminals may orthogonally be multiplexed in the time-domain.

Using the offset (X<0) in equation (5), the value in which user terminal 200 increases the transmission power of the data mapped in the resource except the additional data resource by the absolute value of the offset X is set as the transmission power of the data mapped in the additional data resource. Therefore, the reception quality can be improved in user terminal 200 located near base station 100 or user terminal 200 that is located in the isolated cell to be able to substantially neglect the interference to another cell. The reduced DMRS is easily used in an environment where the interference to the other cell can be neglected. Accordingly, the communication quality of user terminal 200 that can neglect the interference to the other cell such as the peripheral cell can be improved by setting the large power to the additional data resource newly obtained by the use of the reduced DMRS.

The influence of the overhead can be neglected in consideration of the notification of the provided offset value through the higher layer.

Second Exemplary Embodiment (Outline of Communication System)

Similarly to the first exemplary embodiment (see FIG. 7), a communication system according to a second exemplary embodiment consists of base station 100 and one or a plurality of user terminals 200.

In the second exemplary embodiment, the power (power density) offset is added to the additional data resource, and the MCS level is set based on a criterion different from the data except the additional data.

[Configuration of Base Station 100]

Using the higher layer, control section 101 of base station 100 previously notifies user terminal 200 of the MCS level that is used in the additional data resource during the use of the reduced DMRS. The MCS level used in the additional data resource may be set according to the reduced DMRS pattern or the allocated bandwidth. For example, control section 101 sets the MCS level to the higher value as the number of DMRS resources of the reduced DMRS pattern decreases, whereby control section 101 can instruct the MCS level having the better frequency usage efficiency to user terminal 200 having the good channel condition.

Similarly to the DMRS before Rel.11, control section 101 instructs the MCS level to the resource except the additional data resource using an MCS index included in the UL grant.

[Configuration of User Terminal 200]

For the use of the reduced DMRS, control section 205 of user terminal 200 sets the MCS level used in the additional data resource based on the criterion different from the MCS level of the data except the additional data resource. For example, control section 205 uses the MCS level instructed by the UL grant as the MCS level used in the resource except the additional data resource. On the other hand, control section 205 uses the MCS level of which base station 100 previously notifies control section 205 through the higher layer or the MCS level previously decided according to the reduced DMRS pattern and the allocated bandwidth as the MCS level used in the additional data resource.

Coding section 206 and modulating section 207 codes and modulates the data using the MCS level set by control section 205, respectively.

[Operation]

The operations of base station 100 and user terminal 200 of the second exemplary embodiment will be described below. The processing flows of base station 100 and user terminal 200 of the second exemplary embodiment are substantially similar to steps (1) to (4) of the first exemplary embodiment. However, the second exemplary embodiment differs from the first exemplary embodiment in that user terminal 200 sets the MCS level when the reduced DMRS is used.

FIG. 17 illustrates the transmission power (see FIG. 17A) and the MCS level (see FIG. 17B) when the power offset X [dBm] is added to the additional data resource using reduced DMRS pattern (1).

User terminal 200 sets the MCS level corresponding to the MCS index included in the UL grant to the data of the resource except the additional data resource. For example, as illustrated in FIG. 17B, the MCS level having the higher frequency usage efficiency is instructed with increasing MCS index instructed by the UL grant.

On the other hand, user terminal 200 sets the fixed MCS level of which user terminal 200 is separately notified through the higher layer to the data of the additional data resource. For example, in FIG. 17B, the fixed MCS level is used as the data of the additional data resource irrespective of the MCS index instructed by the UL grant. That is, in the additional data resource, user terminal 200 performs the coding and the modulation using the MCS level independent of the instruction of the MCS index.

Thus, user terminal 200 sets the MCS level corresponding to the MCS instruction bit value included in the UL grant to the data of the resource except the additional data resource, and sets the MCS level provided separately through the higher layer to the data of the additional data resource. Similarly to the first exemplary embodiment, the power density offset may be added to the additional data resource instead of the power offset.

[Effect]

In the additional data resource, the transmission power (transmission power density) is decreased by the power (power density) offset, a signal-to-interference noise power ratio (SINR) tends to be lowered on the reception side (base station 100). In the SC-FDMA symbol corresponding to the additional data resource, the signal waveform becomes unstable due to a transition of power switching to another resource. Therefore, in the additional data resource to which the negative power offset is added, the possibility that the decoding and the demodulation are not normally performed increases at the MCS level having the high frequency usage efficiency.

On the other hand, in the second exemplary embodiment, the MCS level of the additional data resource is set to the previously-defined MCS level or the MCS level of which the notification is made through the higher layer. Therefore, base station 100 can receive the data at constant quality in the additional data resource, so that the error rate of the additional data resource can be restrained from increasing. Accordingly, the necessity of the re-transmission decreases, and the high data rate can be implemented.

In embodiment 2, the MCS level of the additional data resource can semi-statically be fixed while the MCS level of the resource except the additional data resource is dynamically changed in each PUSCH allocation. Therefore, the securement of the reception quality and the implementation of the dynamic and variable data rate are facilitated. That is, the MCS level can properly be selected according to the state of user terminal 200.

[Variation 1]

In variation 1, user terminal 200 (control section 205) controls the MCS level of the additional data resource by adding the offset to the MCS level of the resource except the additional data resource. The notification of the offset of the MCS level may be made through the higher layer.

Figures 18A, 18B:
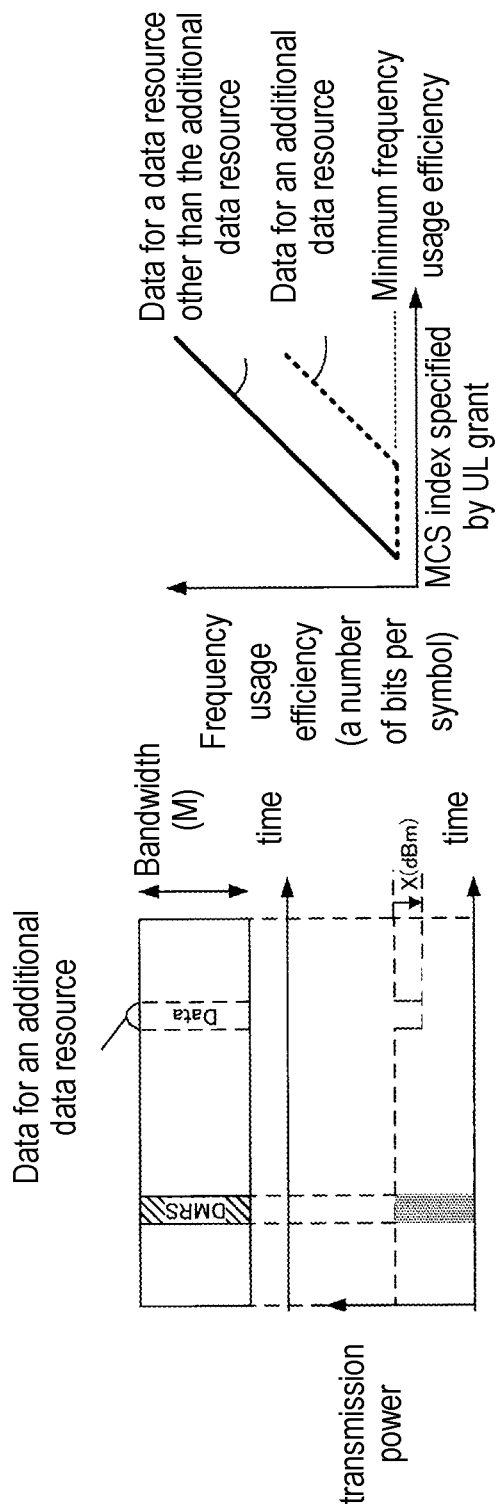
FIG. 18(A) to 18(B) illustrates the offset and the MCS level of the additional data resource according to the second exemplary embodiment of the present disclosure.

Similarly to FIG. 17, FIG. 18 illustrates the transmission power (see FIG. 18A) and the MCS level (see FIG. 18B) in the case that the power offset X [dBm] is added to the additional data resource using reduced DMRS pattern (1).

User terminal 200 sets the MCS level corresponding to the MCS index included in the UL grant to the data of the resource except the additional data resource.

On the other hand, user terminal 200 sets the MCS level lower than that instructed by the UL grant by the offset to the data of the additional data resource. That is, in the additional data resource, user terminal 200 performs the coding and the modulation using the MCS level corresponding to the MCS index that is obtained by adding the offset to the MCS index instructed by the UL grant.

The offset amount at the MCS level may be defined by the allocated bandwidth of the PUSCH or a function of the power (power density) offset of the additional data resource. In this case, a difference in MCS level between the additional data resource and another resource can be changed according to the allocated bandwidth instructed by the UL grant or the power (power density) offset of the additional data resource. Therefore, user terminal 200 can transmit the data in the additional data resource using the more proper MCS level.

[Effect]

According to the first variation, the MCS level of the additional data resource can follow the MCS level instructed by the UL grant. Therefore, in the additional data resource, the MCS level changes dynamically in each PUSCH allocation similarly to the resource except the additional data resource. That is, according to the situation of user terminal 200, the MCS level can be changed and the data rate can flexibly be changed. For example, the PUSCH can be transmitted at more flexible data rate in user terminal 200 having the good state or user terminal 200 that requires the high throughput.

For the sufficiently low MCS level instructed by the UL grant, sometimes the MCS level of the additional data resource deviates from a usable range of the MCS level. In the case that the MCS level that deviates from a usable range is instructed by the UL grant, the previously-decided MCS level may be used as the MCS level of the additional data resource. For example, the previously-decided MCS level is the MCS level at which the data can be transmitted at the minimum frequency usage efficiency (for example, see FIG. 18B). Therefore, user terminal 200 can properly set the MCS level of the additional data resource to transmit the data irrespective of the MCS level instructed by the UL grant. That is, user terminal 200 can always transmit the data in the additional data resource irrespective of the MCS level of the UL grant. Therefore, base station 100 can set the MCS level of the UL grant without considering the influence on the additional data resource, so that the scheduling can more flexibly be performed.

Figures 19A, 19B:
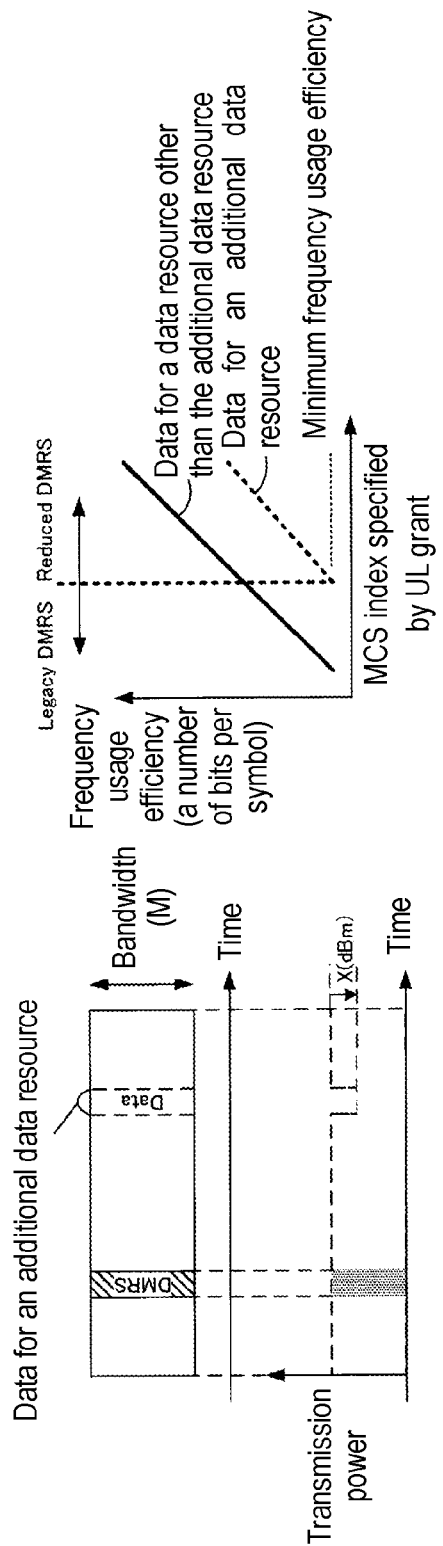
FIG. 19(A) to 19(B) illustrates the offset and the MCS level of the additional data resource according to the second exemplary embodiment of the present disclosure.

User terminal 200 may use the legacy DMRS in the case that the MCS level of the additional data resource deviates from the usable range of the MCS level due to the sufficiently low MCS level instructed by the UL grant. A disadvantage caused by the use of the legacy DMRS is decreased because the low MCS level is frequently used in the case of the poor channel condition or the unnecessity of the high data rate. On the other hand, the degradation of the channel estimation accuracy caused by the poor channel condition can be avoided by the use of the legacy DMRS. Similarly to FIG. 18, FIG. 19 illustrates the transmission power (see FIG. 19A) and the MCS level (see FIG. 19B) in the case that the power offset X [dBm] is added to the additional data resource using reduced DMRS pattern (1). As illustrated in FIG. 19B, user terminal 200 uses the legacy DMRS in the case that the MCS level instructed by the UL grant is sufficiently lower than a predetermined threshold. For example, as illustrated in FIG. 19B, the MCS level (MCS index) having the minimum frequency usage efficiency at which the MCS level instructed by the UL grant is lowered by the offset may be set as the predetermined threshold. In the case that the MCS level instructed by the UL grant is higher than the predetermined threshold, user terminal 200 uses the reduced DMRS pattern, the MCS level instructed by the UL grant, and the MCS level that is obtained based on the offset.

[Second Variation]

In a second variation, the difference between the MCS level instructed by the UL grant and the MCS level of the additional data resource is varied according to the MCS level instructed by the UL grant.

Figures 20A, 20B:
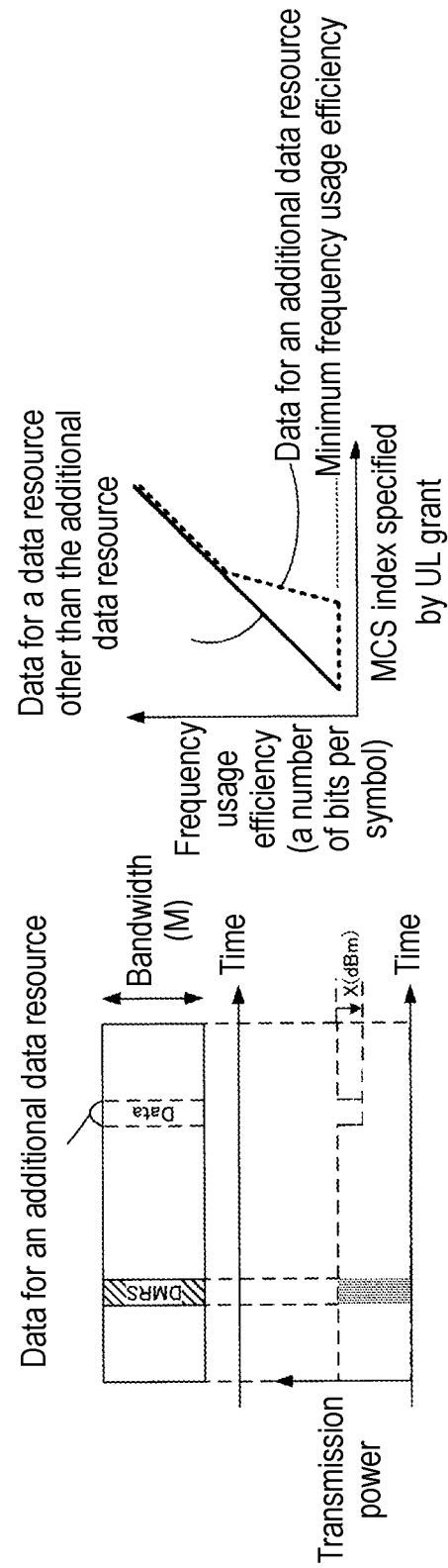
FIG. 20(A) to 20(B) illustrates the offset and the MCS level of the additional data resource according to the second exemplary embodiment of the present disclosure.

Similarly to FIG. 18, FIG. 20 illustrates the transmission power (see FIG. 20A) and the MCS level (see FIG. 20B) in the case that the power offset X [dBm] is added to the additional data resource using reduced DMRS pattern (1).

As illustrated in FIG. 20B, for the sufficiently low MCS level instructed by the UL grant (for example, in the case that the MCS level is less than or equal to a first threshold), in the additional data resource, user terminal 200 codes and modulates the data using the fixed MCS level (for example, the MCS level at which the frequency usage efficiency is the minimum). On the other hand, for the high MCS level instructed by the UL grant (for example, in the case that the MCS level is greater than the first threshold), the MCS level of the additional data resource is changed according to the MCS level instructed by the UL grant. For example, as illustrated in FIG. 20B, the difference between the MCS level instructed by the UL grant and the MCS level of the additional data resource may be decreased with increasing MCS level instructed by the UL grant (with increasing MCS index).

As illustrated in FIG. 20B, for the sufficiently high MCS level instructed by the UL grant, the difference between the MCS level instructed by the UL grant and the MCS level of the additional data resource is eliminated. In other words, in the case that the MCS level instructed by the UL grant is higher than a predetermined threshold (for example, a second threshold), the MCS level of the additional data resource is equal to the MCS level instructed by the UL grant. In the case that the MCS level instructed by the UL grant is less than or equal to the second threshold, the MCS level of the additional data resource is lower than the MCS level instructed by the UL grant.

The data rate at which the data is transmitted in the additional data resource can largely be changed according to the MCS level instructed by the UL grant. Therefore, in addition to the effect similar to that in the first variation, the higher throughput can be implemented such that the UL grant instructs the high MCS level to user terminal 200 having the good state or user terminal 200 that requires the high data rate. The quality of the additional data resource can be ensured such that the UL grant instructs the low MCS level to user terminal 200 having the poor state or user terminal 200 that does not require the high data rate.

Third Exemplary Embodiment (Outline of Communication System)

Similarly to the first exemplary embodiment (see FIG. 7), a communication system according to a third exemplary embodiment consists of base station 100 and one or a plurality of user terminals 200.

In the third exemplary embodiment, in addition to the processing of the first exemplary embodiment, the positive power (power density) offset is added to the DMRS during the use of the reduced DMRS.

[Configuration of Base Station 100]

Using the higher layer, control section 101 of base station 100 previously notifies user terminal 200 of the transmission power (transmission power density) offset added to the DMRS during the use of the reduced DMRS.

[Configuration of User Terminal 200]

For the use of the reduced DMRS, control section 205 of user terminal 200 adds the power (power density) offset of which the notification is made through the higher layer to the DMRS. That is, for the use of the reduced DMRS pattern, control section 205 sets the transmission power (transmission power density) of the DMRS to that higher than the transmission power (transmission power density) of the data mapped in the resource except the additional data resource.

[Operation]

The operations of base station 100 and user terminal 200 of the third exemplary embodiment will be described below. The processing flows of base station 100 and user terminal 200 of the third exemplary embodiment are substantially similar to steps (1) to (4) of the first exemplary embodiment. However, for the use of the reduced DMRS, the second exemplary embodiment differs from the first exemplary embodiment in that user terminal 200 adds the positive power (power density) offset (positive Y) to the DMRS while adding the negative power (power density) offset (negative X) to the additional data resource.

In the case that the power offset is added to the DMRS, for example, a transmission power P^ of the DMRS in the reduced DMRS is expressed by the following equation.

$$\hat{P}=\min \{P_{CMAX}, 10\log_{10}(M)+P(j)+\alpha(j)+\alpha(j) \cdot PL+\Delta_{TF}+ f+Y\} \text{ [dBm]} \quad (6)$$

Where Y indicates the power offset amount with respect to the DMRS. For Y=0, the transmission power P^ of the DMRS is matched with the transmission power of the SC-FDMA symbol (data of the resource except the additional data resource) surrounding the DMRS, and is identical to the transmission power equation before Rel.11.

FIG. 21A illustrates the transmission power in the case that reduced DMRS pattern (1) is used. As illustrated in FIG. 21A, the transmission power is set lower than that of the resource except the additional data resource by X [dBm] in the additional data resource, and the transmission power is set higher than that of the resource except the additional data resource by Y [dBm] in the DMRS. That is, user terminal 200 (control section 205) sets the value in which the transmission power of the data mapped in the resource except the additional data resource is increased by the power offset Y to the transmission power of the DMRS.

On the other hand, in the case that the power density offset is added to the DMRS, for example, the transmission power P^ of the DMRS is expressed by the following equation.

$$\hat{P}=\min \{P_{CMAX}, 10\log_{10}(M)+P(j)+\alpha(j) \cdot PL+\Delta_{TF}+f-10 \log_{10}(D \cdot Y)\} \text{ [dBm]} \quad (7)$$

Where Y' indicates the power density offset [mW/RB], and D' indicates the DMRS bandwidth in the allocated PUSCH bandwidth (M).

FIG. 21B illustrates the transmission power density in the case that reduced DMRS pattern (3) is used. As illustrated in FIG. 21B, the transmission power density is set lower than that of the resource except the additional data resource by X' [mw/RB] in the bandwidth corresponding to the additional data resource, and the transmission power density is set higher than that of the resource except the additional data resource by Y' [mw/RB] in the bandwidth corresponding to the DMRS. That is, user terminal 200 (control section 205) sets the value in which the transmission power density of the data mapped in the resource except the additional data resource is increased by the power density offset Y' to the transmission power density of the DMRS.

In equation (6), the power offset amount of the DMRS of user terminal 200 is kept constant, while the power density offset amount changes according to the allocated bandwidth. On the other hand, in equation (7), the power offset amount of the DMRS of user terminal 200 changes according to the allocated bandwidth, while the power density offset amount is kept constant.

The previously-defined value or the value of which user terminal 200 is notified through the higher layer may be used as the power (power density) offset amount of the DMRS.

[Effect]

Therefore, in the reduced DMRS, the degradation of the channel estimation accuracy due to the decrease of the resource in which the DMRS is mapped can be compensated by the increase in transmission power of the DMRS. Because the DMRS is designed such that the correlation between the cells is decreased, the influence by the interference to the DMRS of another cell such as the peripheral cell is small even if the transmission power (transmission power density) of the DMRS is increased.

User terminal 200 may not only increase only the power of the DMRS but also adjust the power (power density) according to the power (power density) offset of the DMRS in the resource adjacent to the DMRS in the time and frequency ranges. Therefore, user terminal 200 easily and stably transmits the DMRS using the set transmission power of the DMRS.

[First Variation]

In a first variation, the notifications of the DMRS pattern during the transmission of the PUSCH and the power (power density) offset of the DMRS are made by the control bit (DPI (DMRS Pattern Indicator)) instructing the DMRS pattern included in the UL grant.

That is, base station 100 notifies user terminal 200 of the DPI to be able to simultaneously instruct the DMRS pattern and the power (power density) offset of the DMRS. At this point, base station 100 previously notifies user terminal 200 of one or a plurality of power (power density) offset amounts using the higher layer. For example, the a plurality of DMRS patterns of which base station 100 can notify user terminal 200 by the DPI include the legacy DMRS pattern and the reduced DMRS pattern. Base station 100 previously notifies user terminal 200 of these DMRS pattern candidates using the higher layer.

User terminal 200 receives the DPI instructing the DMRS pattern used by user terminal 200 in a plurality of DMRS patterns and the power (power density) offset of the DMRS, determines the DMRS pattern corresponding to the value of the DPI, and controls the transmission power (transmission power density) of the DMRS using the power (power density) offset corresponding to the value of the DPI. FIG. 22 illustrates an example of the correspondence among the DPI, the DMRS pattern, and the power offset Y of the DMRS. Although the power offset [dBm] is correlated in FIG. 22, the power density offset may be correlated instead of the power offset.

The proper DMRS pattern of the reduced DMRS depends on the situation or the interference state of user terminal 200. Accordingly, it is considered that a plurality of DMRS patterns are dynamically switched with respect to user terminal 200. On the other hand, the proper power (power density) offset amount of the DMRS depends on the DMRS pattern. Accordingly, the more flexible and proper power offset of the DMRS can be provided in each DMRS pattern by simultaneously switching the DMRS pattern and the power (power density) offset amount of the DMRS according to the value of the DPI. The necessity of the additional control bit instructing the offset amount is eliminated by making the notification of the offset amount using the DPI instructing the DMRS pattern. Therefore, the increase in overhead is not generated.

Because four kinds of combinations can be set in the DPI (2 bits) in FIG. 22, a plurality of power (power density) offsets of the DMRSs can also be set to the same DMRS pattern. Therefore, the different offsets can be set even if the same DMRS pattern is used according to the state of user terminal 200 or the state of the interference to another cell. For example, the offset can dynamically be set such that the offset is increased for the important data, and such that the offset is decreased for the subframe in which the interference to another cell is reduced.

[Second Variation]

In a second variation, user terminal 200 changes the power (power density) offset amount of the DMRS according to the allocated bandwidth of the PUSCH instructed by the UL grant.

Figure 23:
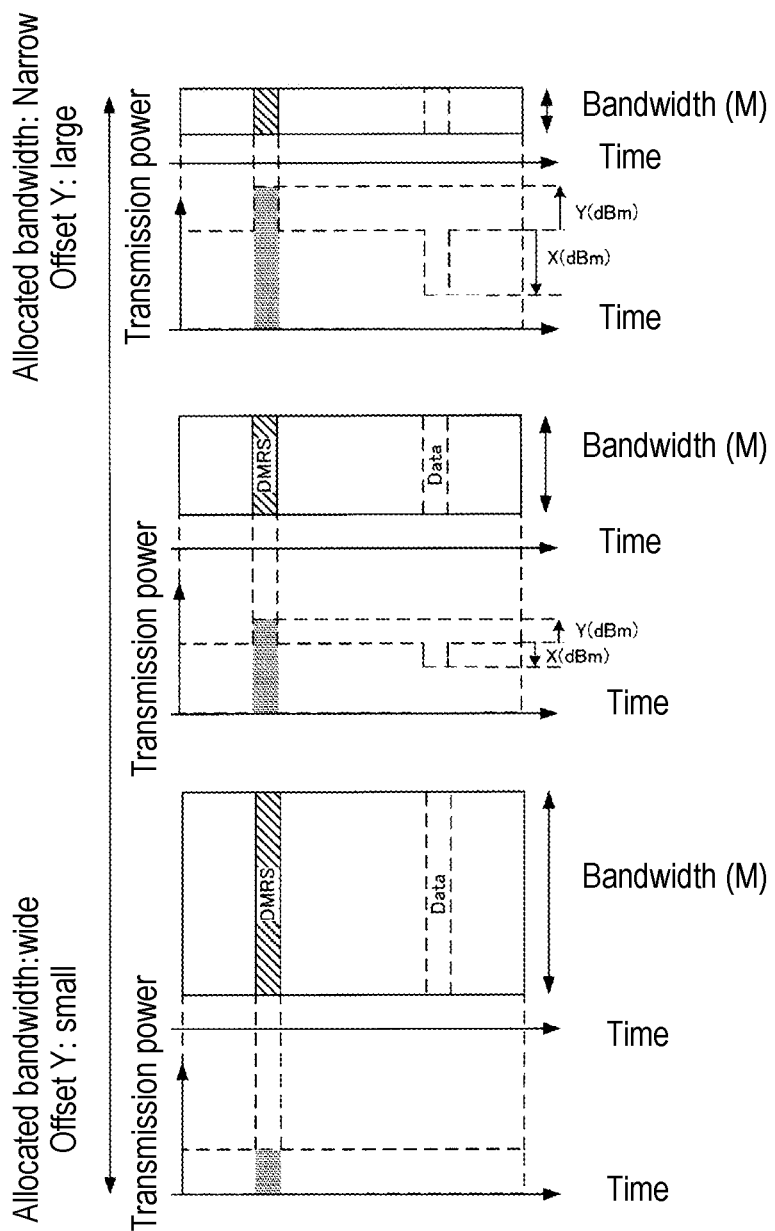
FIG. 23 illustrates the transmission power control of the offset according to the allocated bandwidth according to the third exemplary embodiment of the present disclosure.

For example, as illustrated in FIG. 23, the offset amount is decreased for the wideband allocation, and the offset amount is increased for the narrowband allocation. That is, the power (power density) offset of the DMRS decreases with increasing bandwidth allocated to the PUSCH.

The correspondence between the allocated bandwidth and the offset amount may be defined by a table or a mathematical expression. FIG. 24 illustrates an example of the case that the power offset amount Y [dBm] corresponding to each allocated bandwidth (the assigned RB number of the PUSCH) is provided by the table. Following equation (8) expresses an example of the case that the power offset amount Y [dBm] is provided by the mathematical expression.

$$Y=\min \{P_{max}, y \cdot (N_{RB}^{UL}-M)\} \qquad (8)$$

Where $P_{max}$ indicates the maximum transmission power of user terminal 200, and y is a specified value or a value made by the notification through the higher layer and indicates a coefficient of the transmission power offset that is inversely proportional to the allocated bandwidth.

Although FIG. 24 and equation (8) indicate the case of the power offset, the power offset may be replaced with the power density offset.

The wideband is allocated by the UL grant in the case of the extremely short distance between user terminal 200 and a receiving station (for example, base station 100) or the extremely good channel condition. In such cases, the distance between user terminal 200 and another cell such as the peripheral cell relatively becomes farther, and the interference to another cell by user terminal 200 decreases. Therefore, the sufficiently high channel estimation accuracy can be obtained even if the offset of the transmission power (transmission power density) in the DMRS is decreased in the case that the wideband is allocated to user terminal 200.

On the other hand, it is considered that the narrow bandwidth is allocated by the UL grant in the case of the short distance between user terminal 200 and another cell such as the peripheral cell. In this case, the interference to user terminal 200 by another cell increases. Therefore, in the case that the narrow bandwidth is allocated to user terminal 200, the influence by the interference from the other cell can be reduced by increasing the offset of the transmission power (transmission power density) in the DMRS, and the channel estimation accuracy can sufficiently be obtained. As described above, because the correlation of the DMRSs is designed to be lowered between the cell, the influence by the interference to another cell is decreased such that user terminal 200 increases the transmission power of the DMRS.

Thus, the power (power density) offset of the DMRS is set according to the allocated bandwidth of user terminal 200, whereby the channel estimation accuracy can properly be ensured according to the environment of user terminal 200.

The exemplary embodiments of the present disclosure are described above.

In the exemplary embodiments, by way of example, the present disclosure consists of hardware. Alternatively, the present disclosure may be implemented by software in conjunction with the hardware.

Each functional block of the exemplary embodiments is typically constructed as an LSI that is of an integrated circuit. The functional block may individually be formed into one chip, or some of or all the functional blocks may be formed into one chip. At this point, although the term of the LSI is used, sometimes the LSI is called an IC, a system LSI, a super LSI, and an ultra LSI according to an integration degree.

The technique of integrating the circuit is not limited to the LSI, but the technique may be implemented by a dedicated circuit or a general-purpose processor. An FPGA (Field Programmable Gate Array) or a reconfigurable processor that can reconfigure connection and setting of a circuit cell in the LSI may be used after production of the LSI.

When an integrated circuit technology with which the LSI is replaced appears with the progress of a semiconductor technology, the functional block may be integrated using the technology. A biotechnology may be applied to the integrated circuit technology.

For the use of the second mapping pattern in which a part of the resource in which the DMRS is mapped is replaced with the data resource in the first mapping pattern of the DMRS, the user terminal of the present disclosure includes the following configuration. The user terminal includes: the control section that controls the transmission power or the transmission power density of the second data mapped in the part of the resource by adding the offset to the transmission power or the transmission power density of the first data mapped in the remaining resource; and the transmitting section that transmits the signal including the first data, the second data, and the DMRS.

In the user terminal of the present disclosure, the offset is the negative value, and the control section may set the value that is obtained by adding the offset to the transmission power or the transmission power density of the first data to the transmission power or the transmission power density of the second data.

The user terminal of the present disclosure may further include the receiving section that receives the information instructing the mapping pattern and the offset from the base station, the mapping pattern being used by the transmitting device in the a plurality of mapping patterns including the first mapping pattern and the second mapping pattern.

In the user terminal of the present disclosure, the offset amount may decrease with increasing bandwidth allocated to the signal.

In the user terminal of the present disclosure, the offset is a positive value, and the control section may set the value that is obtained by adding the offset to the transmission power or the transmission power density of the first data to the transmission power or the transmission power density of the second data.

In the user terminal of the present disclosure, the offset may be the value that zeros the transmission power or the transmission power density of the second data. In the user terminal of the present disclosure, the control section may set the second MCS level to the second data based on the criterion different from the first MCS level for the first data.

In the user terminal of the present disclosure, the notification of the first MCS level may be made by the control information transmitted from the base station, and the second MCS level may previously be defined.

In the user terminal of the present disclosure, the control section may control the second MCS level by adding the second offset to the first MCS level.

In the user terminal of the present disclosure, the second MCS level may be equal to the first MCS level when the first MCS level is greater than a predetermined threshold, and the second MCS level may be lower than the first MCS level when the first MCS level is less than or equal to the predetermined threshold.

In the user terminal of the present disclosure, the control section may set the transmission power or the transmission power density of the resource in which the DMRS is mapped in the second mapping pattern to the transmission power or transmission power density higher than that of the first data, when the second mapping pattern is used.

The user terminal of the present disclosure may further include the receiving section that receives the information instructing the mapping pattern and the third offset from the base station, the mapping pattern being used by the transmitting device in the a plurality of mapping patterns including the first mapping pattern and the second mapping pattern. The control section may set the transmission power or the transmission power density of the DMRS by adding the third offset to the transmission power or the transmission power density of the first data.

In the user terminal of the present disclosure, the third offset amount may decrease with increasing bandwidth allocated to the signal.

For the use of the second mapping pattern in which a part of the resource in which the DMRS is mapped is replaced with the data resource in the first mapping pattern of the DMRS, the transmission method of the present disclosure performs the following steps. That is, the transmission power or the transmission power density of the second data mapped in the part of the resource is controlled by adding the offset to the transmission power or the transmission power density of the first data mapped in the remaining resource, and the signal including the first data, the second data, and the DMRS is transmitted.

The exemplary embodiments can be applied to a mobile communication system.

DESCRIPTION OF SYMBOLS 100 base station
200 user terminal
11 control signal generating section
12, 25 transmitting section
13, 21 receiving section
14, 114 channel estimating section
15 received data processing section
101, 23, 205 control section
102 control information generating section
103, 206 coding section
104, 207 modulating section
105, 212 mapping section
106, 213 IFFT section
107, 214 CP adding section
108, 215 transmitting section
109, 201 receiving section
110, 202 CP removing section
111, 203 FFT section
112 demapping section
113 CSI estimating section
115 equalizing section
116 IDFT section
117 demodulating section
118 decoding section
119 detecting section
22, 204 control information extracting section
24, 208 DMRS generating section
209 SRS generating section
210 multiplexing section
211 DFT section

The invention claimed is:

1. A transmitting device comprising:
a controller which, in operation, controls a transmission power or a transmission power density of second data by adding an offset to a transmission power or a transmission power density of first data, wherein in a first mapping pattern that specifies reference resources in which reference signals are mapped, a portion of the reference resources is replaced with a data resource to form a second mapping pattern including the data resource and remaining resources that are not replaced, and in the second mapping pattern the second data is mapped in the data resource and the first data is mapped in the remaining resources; and
a transmitter which, in operation, transmits signal including the first data, the second data, and the reference signal.

2. The transmitting device according to claim 1, wherein the offset is a negative value.

3. The transmitting device according to claim 1, further comprising:
a receiver which, in operation, receives from a base station information indicating which mapping pattern, out of a plurality of mapping patterns including the first and second mapping patterns, is used and the offset.

4. The transmitting device according to claim 1, wherein the offset is smaller with an increasing bandwidth allocated to said signal.

5. The transmitting device according to claim 1, wherein the offset is a positive value.

6. The transmitting device according to claim 1, wherein the offset is a value that zeros the transmission power or the transmission power density of the second data.

7. The transmitting device according to claim 1, wherein the controller, in operation, sets a second MCS (Modulation and coding scheme) level for the second data based on a criterion different from a first MCS level for the first data.

8. The transmitting device according to claim 7, wherein the first MCS level is indicated in control information transmitted from a base station, and the second MCS level is predefined.

9. The transmitting device according to claim 7, wherein the controller, in operation, controls the second MCS level by adding a second offset to the first MCS level.

10. The transmitting device according to claim 7, wherein the second MCS level is equal to the first MCS level when the first MCS level is greater than a threshold, and
the second MCS level is lower than the first MCS level when the first MCS level is equal to or less than the threshold.

11. The transmitting device according to claim 1, wherein the controller, in operation, sets a transmission power or a transmission power density of the reference signal higher than the transmission power or the transmission power density of the first data when the second mapping pattern is used.

12. The transmitting device according to claim 11, further comprising:
a receiver which, in operation, receives from a base station information indicating which mapping pattern, out of a plurality of mapping patterns including the first and second mapping patterns, is used and a third offset,
wherein the controller, in operation, sets the transmission power or the transmission power density of the reference signal by adding the third offset to the transmission power or the transmission power density of the first data.

13. The transmitting device according to claim 12, wherein the third offset is smaller with an increasing bandwidth allocated to said signal.

14. A transmitting method comprising:
controlling a transmission power or a transmission power density of second data by adding an offset to a transmission power or a transmission power density of first data, wherein in a first mapping pattern that specifies reference resources in which reference signals are mapped, a portion of the reference resources is replaced with a data resource to form a second mapping pattern including the data resource and remaining resources that are not replaced, and in the second mapping pattern the second data is mapped in the data resource and the first data is mapped in the remaining resources; and
transmitting signal including the first data, the second data, and the reference signal.

15. The transmitting method according to claim 14, further comprising:
receiving from a base station information indicating which mapping pattern, out of a plurality of mapping patterns including the first and second mapping patterns, is used and the offset.

16. The transmitting method according to claim 14, further comprising:
setting a second MCS (Modulation and coding scheme) level for the second data based on a criterion different from a first MCS level for the first data.

17. The transmitting method according to claim 16, further comprising:

controlling the second MCS level by adding a second offset to the first MCS level.

18. The transmitting method according to claim 16, wherein the second MCS level is equal to the first MCS level when the first MCS level is greater than a threshold, and
the second MCS level is lower than the first MCS level when the first MCS level is equal to or less than the threshold.

19. The transmitting method according to claim 14, further comprising:
setting a transmission power or a transmission power density of the reference signal higher than the transmission power or the transmission power density of the first data when the second mapping pattern is used.

20. The transmitting method according to claim 19, further comprising:
receiving from a base station information indicating which mapping pattern, out of a plurality of mapping patterns including the first and second mapping patterns, is used and a third offset; and
setting the transmission power or the transmission power density of the reference signal by adding the third offset to the transmission power or the transmission power density of the first data.

* * * * *